US012046898B2

(12) United States Patent
Hannon

(10) Patent No.: US 12,046,898 B2
(45) Date of Patent: *Jul. 23, 2024

(54) SYSTEMS AND METHODS FOR ENERGY-RELATED LOAD OPTIMIZATION

(71) Applicant: Clarity Grid Solutions, Inc., Houston, TX (US)

(72) Inventor: Kevin P. Hannon, Houston, TX (US)

(73) Assignee: Clarity Grid Solutions, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,764

(22) Filed: Jun. 29, 2022

(65) Prior Publication Data
US 2023/0061173 A1     Mar. 2, 2023

Related U.S. Application Data

(63) Continuation of application No. 16/586,834, filed on Sep. 27, 2019, now Pat. No. 11,381,081.
(Continued)

(51) Int. Cl.
*H02J 3/14* (2006.01)
*H02J 3/00* (2006.01)
(Continued)

(52) U.S. Cl.
CPC ........ *H02J 13/00002* (2020.01); *H02J 3/003* (2020.01); *H02J 3/004* (2020.01);
(Continued)

(58) Field of Classification Search
CPC .... H02J 3/003; H02J 3/004; H02J 3/14; H02J 3/144; H02J 3/381; H02J 3/382;
(Continued)

(56) References Cited

U.S. PATENT DOCUMENTS 8,560,134 B1 * 10/2013 Lee .................. G06Q 50/06
700/28
9,558,404 B2 * 1/2017 Rebec .................. H02J 3/00
(Continued)

*Primary Examiner* — M. N. Von Buhr
(74) *Attorney, Agent, or Firm* — Wolf, Greenfield & Sacks, P.C.

(57) ABSTRACT

Provided are energy device control systems for distributed grid subsystem that control a first power demand of a plurality of appliances. The control system comprises a graphical user interface configured to accept a user input indicative of a first demand and dynamic allocation flexibility associated with the a respective energy device; a communication interface configured to aggregate dynamic allocation values from a plurality of system nodes including at least the user input indicative of a first demand and the dynamic allocation flexibility; and at least one processor programmed to: generate a learning model for evaluating dynamic future allocation with future energy execution prediction, wherein the dynamic future allocation includes at least energy operational information based on a categorization of energy usage at a plurality of respective energy devices; and trigger energy generation on the energy grid at respective generator nodes according to the learning model and dynamic projections.

20 Claims, 29 Drawing Sheets

Related U.S. Application Data

(60) Provisional application No. 62/738,968, filed on Sep. 28, 2018.

(51) Int. Cl.
  *H02J 3/38* (2006.01)
  *H02J 13/00* (2006.01)

(52) U.S. Cl.
  CPC ............... *H02J 3/14* (2013.01); *H02J 3/144* (2020.01); *H02J 3/381* (2013.01); *H02J 3/388* (2020.01); *H02J 13/00034* (2020.01); *H02J 2203/20* (2020.01); *H02J 2310/14* (2020.01); *H02J 2310/64* (2020.01)

(58) Field of Classification Search
  CPC ............... H02J 3/388; H02J 13/00002; H02J 13/00034; H02J 2203/20; H02J 2310/14; H02J 2310/54; H02J 2310/64; Y02B 70/30; Y02B 70/3225; Y02E 60/00; Y04S 10/30; Y04S 20/222; Y04S 20/242; Y04S 440/20; Y04S 50/10
  See application file for complete search history.

(56) References Cited

U.S. PATENT DOCUMENTS

| | | | | |
|---|---|---|---|---|
| 9,612,286 | B2* | 4/2017 | Gupta | G06F 15/00 |
| 9,671,843 | B2* | 6/2017 | Ellis | H02J 3/381 |
| 9,702,730 | B2* | 7/2017 | Bell | H02J 13/00 |
| 10,013,725 | B2* | 7/2018 | Meghani | G06Q 10/10 |
| 10,114,347 | B2* | 10/2018 | Gupta | H02J 3/14 |
| 10,845,768 | B2* | 11/2020 | Gervais | G01S 17/04 |
| 11,381,081 | B2* | 7/2022 | Hannon | H02J 13/00002 |
| 2012/0265586 | A1* | 10/2012 | Mammone | G06Q 50/06 |
| | | | | 705/14.1 |
| 2013/0226360 | A1* | 8/2013 | Wilkins | H02J 3/14 |
| | | | | 700/295 |
| 2015/0248118 | A1* | 9/2015 | Li | F24F 11/46 |
| | | | | 706/12 |
| 2020/0106269 | A1 | 4/2020 | Hannon | |
| 2020/0156495 | A1* | 5/2020 | Lindup | B60L 58/16 |
| 2021/0006069 | A1* | 1/2021 | Zeng | H02J 3/144 |
| 2021/0265839 | A1* | 8/2021 | Davis | H02J 3/12 |

* cited by examiner

Fig. 27
End User State 1: Customer Contact and Price\Tariff\Usage Analytics
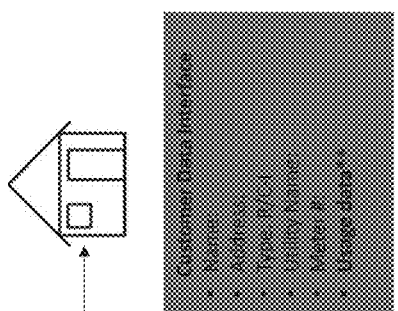
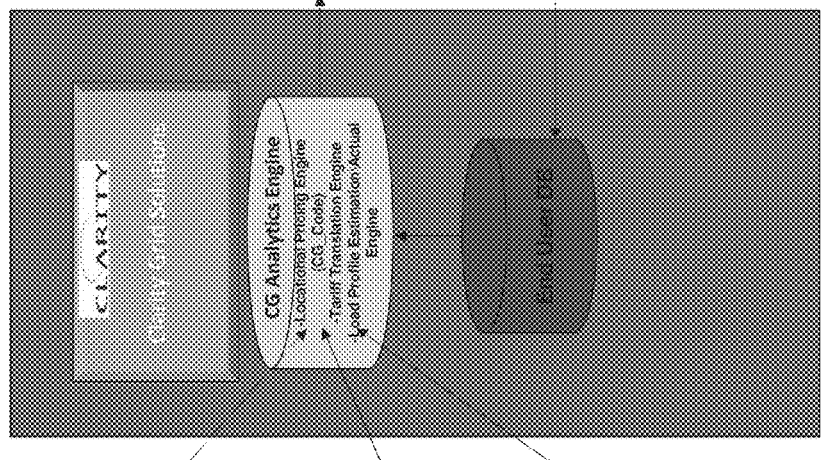

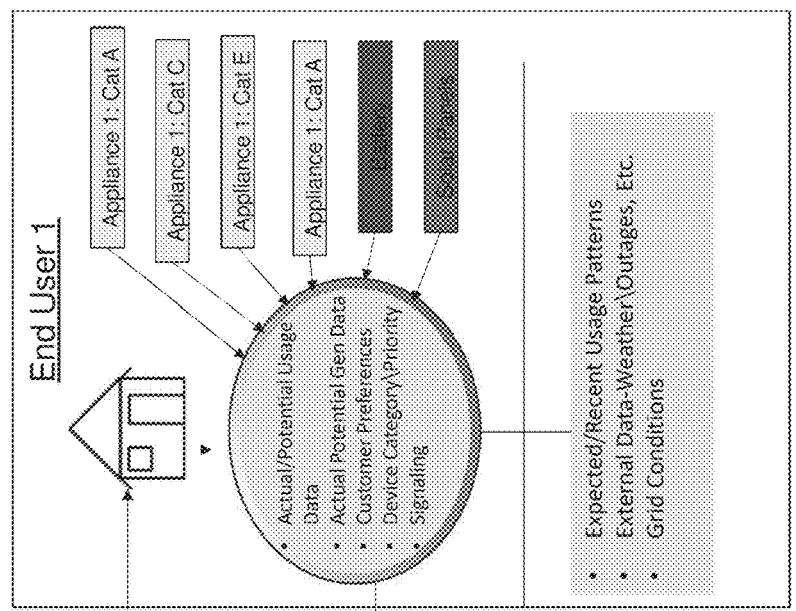
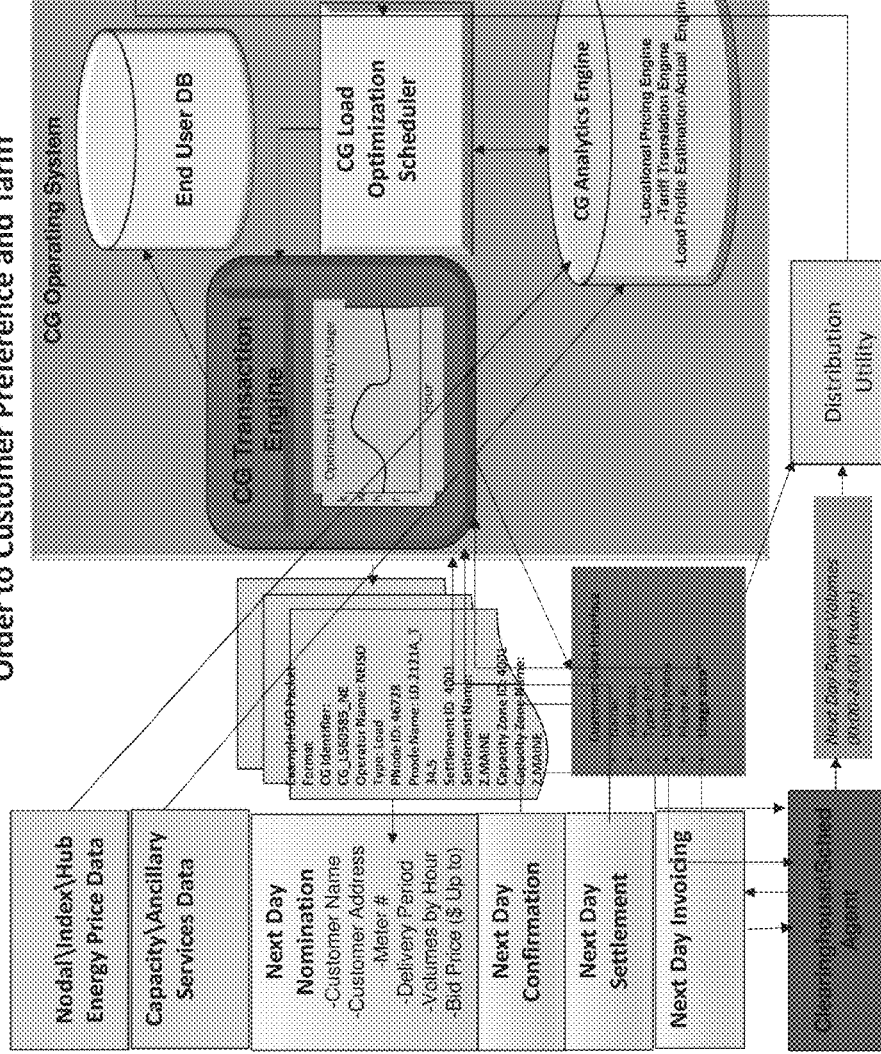
Fig. 28
End User State 2: Optimizing Next Day Purchase Order to Customer Preference and Tariff

Fig. 29
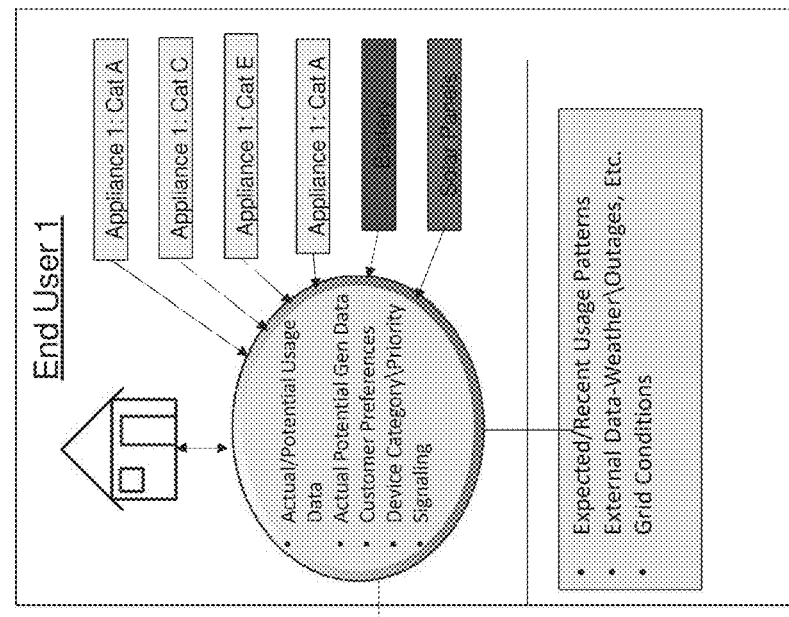
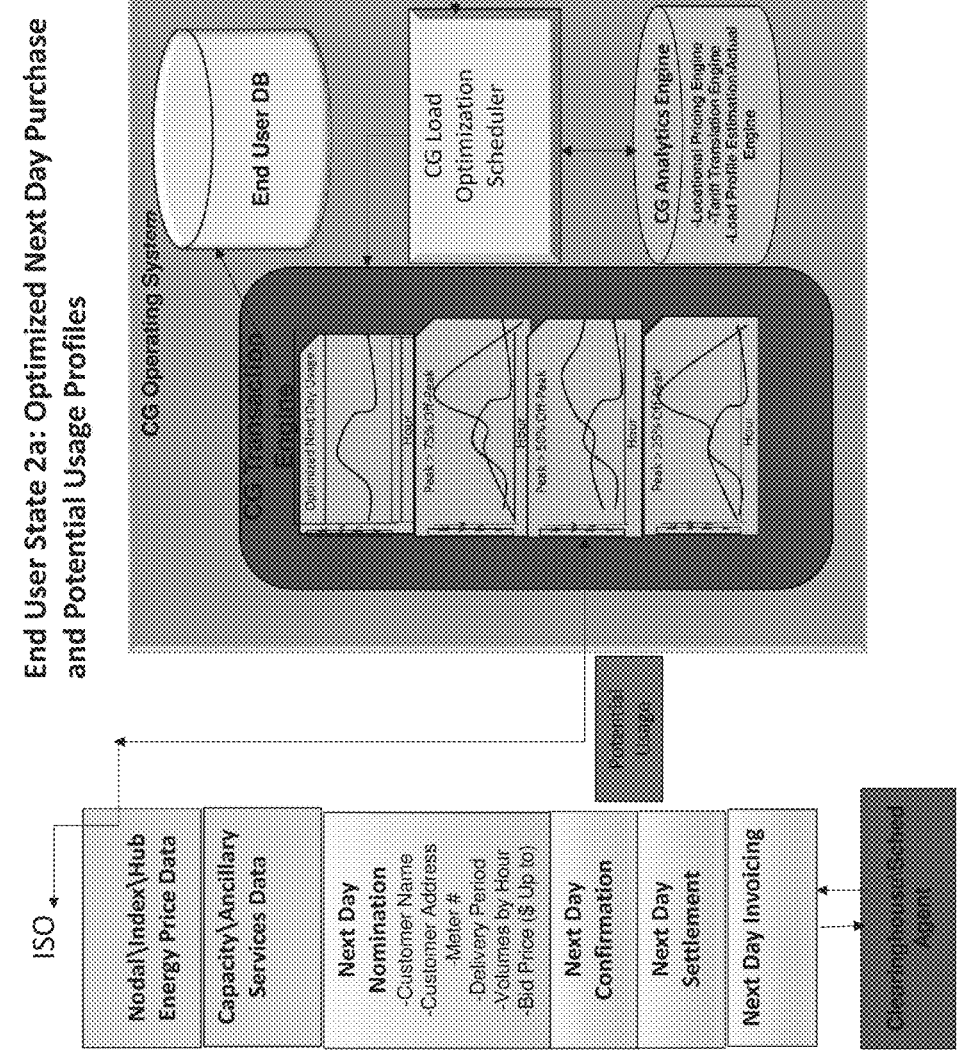

| ISO | Distribution Utilities | Pricing Nodes for Load | Pricing Zones | Pricing Nodes for Generation |
|---|---|---|---|---|
| NEISO | 97 | 750 | 8 | 356 |
| NYISO | 54 | 44* | 11 | 504 |
| PJM | 259 | 9,533 | 21 | 2,092 |
| MISO | 566 | 13,356 | 366 (CP nodes) | 1,387 |
| SPP | 280 | 6,450 | 17 (AP nodes) | 790 |
| ERCOT | 119 | 12,890 | 4 | 612 |
| CAISO | 79 | 7,089 | 55 | 2,091 |
| TOTAL | 1,454 | 50,112 | 482 | 7,832 |

*NYISO LBMP Trial

FIG. 32

SYSTEMS AND METHODS FOR ENERGY-RELATED LOAD OPTIMIZATION

RELATED APPLICATIONS

This Application is a Continuation of and claims priority under 35 U.S.C. § 120 to U.S. application Ser. No. 16/586,834, filed Sep. 27, 2019, entitled "SYSTEMS AND METHODS FOR ENERGY-RELATED LOAD OPTIMIZATION", now U.S. Pat. No. 11,381,081, issued Jul. 5, 2022, which claims priority under 35 U.S.C. § 119(e) to U.S. Provisional Patent Application No. 62/738,968, filed Sep. 28, 2018, entitled "SYSTEMS AND METHODS FOR ENERGY-RELATED LOAD OPTIMIZATION," each of which is incorporated herein by reference in their entirety.

BACKGROUND

In the traditional Utility-based electricity commercial model, delivery of power was, and is still, dominated by an "all you can eat" fixed price commercial model. Even as the industry has unbundled the traditional monopoly function of local distribution of energy from the competitive wholesale energy portion of the service, fixed prices for energy remain the dominant economic model. This is true even as the wholesale electricity market as overseen by the seven Independent System Operators (ISOs) spanning across over 70% of the US, has become even more reliable, efficient and transparent, offering daily and hourly market based pricing across tens of thousands of locations for periods of time as short as five minute intervals. Given retirements of large fossil based fuel generating plants and the rise of renewable generation (solar, wind, etc.), as well as the introduction of local battery storage capacity, the technical challenge for the ISOs and its delivery partners of balancing system supply and demand instantaneously under the traditional fixed price model will become even more difficult absent significant technical improvements in communication, analytics, and execution capabilities.

In wholesale markets the cost of electricity typically varies based upon a few variables: 1) Where the power is consumed, in industry parlance, its Locational Marginal Price (LMP), as defined by an ISO price code (Node\Index\Hub), 2) When the power is consumed (Year, Month, Day, Hour), 3) How much of the power is consumed (kwhr/mwhr), and 4) In some cases, how sharply consumption increases, by how much, and when consumption increases occur (Demand/kw).

FIG. 1 is a map reporting where and how electricity is generated, and estimated capacities at each site, in accordance with U.S. Energy Information Administration data. It can be seen from FIG. 1 that electricity generation in the United States is distributed throughout the country. FIG. 2 is an early map showing interconnections between the eight Regional Entities in the Electric Reliability Organization (ERO) Enterprise who coordinate within their region to maintain the integrity and reliability of their respective geographic sections of the Grid. There are three physical interconnections in the United States, namely: (1) the Eastern Interconnection, which includes the Florida Reliability Coordinating Council (FRCC), Midwest Reliability Organization (MRO), Northeast Power Coordinating Council (NPCC), Reliability First Corporation (RFC), SERC Reliability Corporation (SERC), and Southwest Power Pool Regional Entity (SPP RE); (2) the ERCOT Interconnection, which includes the Texas Reliability Entity (TRE); and (3) the Western Interconnection, which includes the Western Electricity Coordinating Council (WECC). This interconnected system is a "system of systems," and NERC delegates responsibilities to the Regional Entities, and delegation agreements between NERC and the Regional Entities address the development of regional reliability standards; monitoring compliance with and enforcing mandatory reliability standards (both North American wide and regional), certification of registered entities, registration of owners; reliability assessment and performance analysis; training and education; event analysis and reliability improvement; and situation awareness and infrastructure security.

The transmission lines, which may be located in different states, are typically owned by the utility or transmission companies, and controlled by regional Independent System Operators (ISOs), Regional Transmission Organizations (RTOs), or public or private utility companies. The generation and transmission of electricity is usually managed by the regional entities that monitor the grid, and market operations, security, and other aspects of the electric power system. All utilities and ISOs are responsible for meeting NERC compliance standards. Utilities that are located within the United States and engage in interstate commerce fall under FERC authority. ISOs balance supply and demand of energy to a major portion of the United States, e.g., as can be seen from FIG. 3. There are seven ISOs/RTOs in the United States, including California ISO (CAISO), New York ISO (NYISO), Electric Reliability Council of Texas (ERCOT), Midcontinent Independent System Operator (MISO), New England ISO (ISO-NE), Pennsylvania Jersey Maryland (PJM) ISO, and the Southwest Power Pool (SPP) and two in Canada; Alberta Electric System Operator (AESO), Independent Electricity System Operator (IESO). Not all utilities are members of ISOs, and not all of the United States is covered by an ISO/RTO. Utilities in regions where there is not an ISO do not engage in wholesale power markets and, although these regions must conform to open access as mandated by FERC, the power exchanges between utilities is mostly facilitated through bilateral contracts and power purchase agreements. In total, ISOs now serve approximately 70% of the lower 48 states, with the electric grid providing both wholesale price transparency and reliable delivery to distribution points (substations).

Wholesale electricity typically is distributed through state or locally regulated distribution companies to consumers\end users. The transmission and distribution systems typically use a number of different devices for management and control of the electric system including, for example, dynamic voltage support, remedial action schemes, capacitors, storage and flow control devices, etc.. Some consumers may also have micro-grids of their own.

It should be appreciated from the above that there are a number of different organizations and structures in place for overseeing these power generation, transmission, and distribution activities. In the United States, this includes, for example, over 2,000 utilities, thousands of generators, 22 Reliability Coordinators, 153 Control Areas (CAs), etc.

SUMMARY

It is realized that even though different entities are involved at different levels in generation, transmission, and distribution of electricity, as well as monitoring and control of the overarching power grid, conventionally there is no single standardized and integrated system that can be used to monitor and manage the electric power grid in real-time across all of its many and varied elements, limiting management options for various conventional approaches. These issues are exacerbated by the increasing drive towards a distributed grid, where power generation is increasingly done "at the edge" (e.g., smaller scale generators closer to or being the end user energy consumer). Indeed, currently there is no one information management system for the power grid in total, integrated across multiple business systems, companies, and control areas, responsible for managing the security, timeliness, accuracy, or accessibility of information for grid operations, reliability, market operations, and system security. Further, conventional systems cannot adequately manage, capture, and forecast with the increasing distributed model.

Operators of the ISOs allocate resources between generation, transmission, and distribution at a wholesale level by employing optimization systems employing security constrained economic dispatch (SCED) programs. These systems attempt to capture both the energy volume and price at which all parties will execute transactions at thousands of geographic points or "nodes" on the Operator's system. It should be noted that while generators are compensated at the system's price for the specific geographic node, in most cases, prices to distribution parties (load) are charged the average of specific geographic nodes for a given area (zones). However, regardless of ultimate pricing conventions, all transactions for delivery of energy (load) are initiated and scheduled at the ISO defined distribution bus (substation) which is typically the closest point to the end user.

Moreover, even within a given territory (e.g., within a given ISO), various conventional systems fail to fully leverage two-way communication between energy producers and the consumers through the ISO. To the contrary, energy consumers typically request energy loads and ISOs ensure that they are provided without further interaction. For example, a given ISO will use historical information to predict when loads might be required and plan accordingly. Although such historical information may be fed into models that take into account temperature and/or other environmental factors to help refine estimates, these models are essentially static and backward looking, not taking into account how customer's consumption patterns may change given alternative price scenarios.

Various aspect of certain example embodiments relates to systems and/or methods for accomplishing these and/or other ends. Another aspect of certain example embodiments relates to facilitating two-way, and/or real-time communication between energy grid producer related systems and end use energy consumers, e.g., for current and/or future load forecasting and, thus, improved stability of the overall grid.

It is further realized that while ISO convention has been to provide scarcity signals (prices) to consumers (load) which represent an average, technology improvements executed in some embodiments enable consumers to employ some aspects of energy production (generation) through the siting of solar panels, small scale generation, and batteries at end user facilities. The inclusion of generation devices at end user locations increase the challenges for executing management systems Various embodiments, use the transmission of the initial location appropriate scarcity signals to manage both generation and, what have historically been exclusively load locations. Various embodiments incorporate location-specific scarcity signals to optimize both generation and load and to systematically trigger behavioral changes which result—as discussed these operations can be thought of as facilitating a two way, or interactive grid.

Another aspect of certain example embodiments relates to providing a common encoding protocol among and between energy grid producers related systems and end use energy consumers. In various embodiments, the common encoding protocol enables the system to leverage information from various energy endpoints (e.g., energy consumption devices, energy generation devices, etc.), and even end points with different communication protocols, devices providing less information, etc., to achieve improvements in modeling and improvements in efficiency for generating and delivering energy.

Therefore, a need exists for improvements in management capability of the disparate systems and components of the grid. It is realized that management and efficiency in energy generation and distribution can be improved over various current approaches, for example, by implementing translation matrixes that enable full use of information captured from grid elements and/or end point energy devices regarding scheduled use and/or future preferences for consumption.

Thus, it will be appreciated that it would be desirable to provide techniques for improving load forecasting accuracy and/or energy-related load optimization in connection with an energy grid. In this regard, it would be desirable to (a) schedule the provisioning of energy based on retrieved operational information associated with supply-side components of the energy grid, requests for energy from a plurality of end use energy consumers, and/or preferences associated with those received requests in an efficient, stable, and load-balanced manner, and (b) cause the actual delivery of energy in accordance with the schedule. Advantageously, the system can be made more stable and reliable.

It is realized that on a retail level, local utilities will often tailor operation based on a spectrum of: a) (Fixed): Fixed allocations for all consumption, b) (Seasonal\Time of Use (TOU): Fixed allocation by; consumption during a given time period (month, day, hour, etc.), and, c) Real Time Pricing/Allocation (RTP): Fixed allocations for the hour or even 5-15 minute interval only, and may also incorporate, d) (Demand-Based): Peak usage, also possibly modified by level of consumption or time period. In this way energy generation/distribution control attempts to migrate from fixed allocation (where no incentives to change historical usage patterns exist) to some elements of scarcity signaling through market prices via Time of Use (TOU) or RTP tariffs. Demand Response (DR) tariffs may also incorporate such incentives based upon scarcity signaling. This relationship between consumption and scarcity signals is further complicated by the introduction of distributed generation (e.g., solar panels, distributed generations, etc.) and storage (batteries) at local sites. Such attempts are meant to change the nature of static historic usage patterns (load profiles) by end users in reaction to such scarcity signals so as to lower overall systems costs while passing along some or all of these savings to consumers.

It is further realized however, that these attempts can fail if end users: a) do not receive the appropriate scarcity signals for their location, b) can't fully account for delivered costs of electricity by their Utility Provider, c) can't translate their usage/generation/storage flexibility based upon consumer preference, into executable transaction formats, and; d) can't filter these transactions through available tariff restrictions\opportunities as dictated by the local Utility or ISO.

Various aspects of the system ensure capture of appropriate signals from grid elements and/or end user devices, and may include use of translation matrixes to ensure complete data capture and usability. According to various embodiments, the system establishes communication channels with, and/or monitors automatically initial indicative pricing information which can be combined with historic usage and forecast usage based upon preferences to develop accurate usage/pricing models and further to filter whatever may be optimal in regards to ISO wholesale pricing against what optimizations are actually possible to achieve. Such limitations may be based on the respective Utility's tariff structure.

According to some other aspects, the system is configured to account for both the utility tariff structures as well as the ISO protocols for more varied transactions such as; Demand Response (DR), Distributed Generation (DG), and Net Metering, etc. in which energy is injected into the Grid (as well as conventional withdrawal). Other energy delivery approaches are also incorporated into the energy consumption and delivery models provided by various embodiments. In various examples, the system is configured to request and/or trigger energy generation and distribution based on modeling use, optimizing against the model, and schedule delivery according to the model, while continuously updating the model and/or delivery schedule. According to some embodiments. the scheduling system draws upon large historical datasets of pricing unique to the customer's location at the same time capturing an initial set of hourly consumption preferences of the customer. By recognizing whether the relevant wholesale market allows for a price limit to be set for each of these hourly consumption requests and whether this consumption may be deferred. In various examples, the system allows the consumer to meet their overall consumption needs while minimizing cost.

According to one embodiment, the algorithms embedded in the system can be derived by: 1) wholesale price matching to location through proprietary database, 2) unique combination of relevant; a) wholesale pricing protocols, b) utility tariff structure, c) estimated/actual usage profiles, d) ISO protocols, and e) customer preferences and device hierarchy. Multiple embodiments, provide various combinations of data relating to each of these categories and can yield unique and valuable transaction based instructions to consume (generate) or not consume (generate) energy for any given time period for this customer uniquely.

According to one aspect, an energy device control system executing on a distributed grid subsystem operative to control a first power demand of a plurality of appliances is provided. The system comprises a graphical user interface configured to accept a user input indicative of a first demand and dynamic allocation flexibility associated with a respective energy device, a communication interface configured to aggregate dynamic allocation values from a plurality of system nodes including at least the user input indicative of a first demand and the dynamic allocation flexibility, and at least one processor programmed to generate a learning model for evaluating dynamic future allocation with future energy execution prediction, wherein the dynamic future allocation includes at least energy operational information based on a categorization of energy usage at a plurality of respective energy devices, and trigger energy generation on the energy grid at respective generator nodes according to the learning model and dynamic projections.

According to one embodiment, at least one processor is further configured to assign categories of energy execution for a respective device as part of generating the learning model for dynamic allocation flexibility. According to one embodiment, at least one processor is further configured to assign a category of energy requirement for a respective device as part of generating the learning model for dynamic allocation flexibility. According to one embodiment, the category is selected from a plurality of categories including at least a first category for non-deferrable energy consumption, a second category for a deferrable energy consumption having a time limited window for deferment, and a third category having a longer time window for deferment relative to the second category.

According to one aspect, a method for energy device control executing on a distributed grid subsystem, the method operative to control a first power demand of a plurality of appliances is provided. The method comprises accepting in a graphical user interface a user input indicative of a first demand and dynamic allocation flexibility associated with the a respective energy device, aggregating, by at least one processor, dynamic allocation values from a plurality of system nodes including at least the user input indicative of a first demand and the dynamic allocation flexibility, and generating, by at least one processor, a learning model for evaluating dynamic future allocation with future energy execution prediction, wherein the dynamic future allocation includes at least energy operational information based on a categorization of energy usage at a plurality of respective energy devices, and triggering, by the at least one processor, energy generation on the energy grid at respective generator nodes according to the learning model and dynamic projections.

According to one embodiment, the method further comprises an act of assigning categories of energy execution for a respective device as part of generating the learning model for dynamic allocation flexibility. According to one embodiment, the method further comprises an act of querying respective devices to capture additional information.

According to one aspect, an energy device control system executing on a distributed grid subsystem operative to respond or control power demand for a plurality of appliances, the energy device control is provided. The system comprises an interface component configured to capture information associated with a first demand or a dynamic allocation flexibility associated with the a respective energy device, a communication interface configured to aggregate dynamic allocation values from a plurality of system nodes including at least the information indicative of a first demand and the dynamic allocation flexibility, and at least one processor programmed to, identify un-profiled energy devices and apply a classification learning model for classifying un-profiled energy devices into a category of energy usage including at least a first and second category of use, execute a machine learning model for evaluating dynamic future allocation with future energy execution prediction, wherein the dynamic future allocation includes at least energy operational information based on a categorization of energy usage at a plurality of respective energy devices, and trigger energy fabrication on the energy grid at respective generator nodes according to the learning model and dynamic projections.

According to some further aspects, standardization is a feature of creating technical solutions for the grid. In some embodiments, the way in which indicative pricing is; a) displayed to end users, b) read by device level code, and 3) provided to ISOs/Utilities enables optimizations and stress reducing transactions within the grid (e.g., eliminating capacity overload, bottlenecks, congestion, or mitigating increased pricing based on demand, among other options). In some embodiments, the look and feel of the user interface displays provided by the system to the consumer are the same across all ISO territories, facilitating transmission of load data and forecasts as well as transaction execution, limiting user error in operation and selection in the respective interfaces. Reducing user error in this context provides significant efficiency in the system's execution, especially over conventional approaches where non-standardized formats limit adoption, and even the ability of users to operate various interfaces. According to various implementation, the system provides efficiency optimizations within respective ISOs.

In some further aspects, the system is configured to provide for the optimization of consumption of power in the real time (hourly) market after initial provision in the next day market. According to various embodiments, the system is configured to take into account the protocols of the relevant ISO (e.g., which vary) in order to generate optimal demand and distribution models, as well as continuously update the model as projected demand becomes more certain (e.g., as times associated with projected demand approach actual time). In some examples, the system leverages options at some ISOs which allow for some types of bid/offer transactions prior to the start of the hour, and is further configured to address ISOs which do not. For example, the system is configured to rely upon modeling of next hour price forecasts to initiate a change in consumption in real time, or nominate based on future prices published by the ISO if available. In alternative embodiments, the system triggers execution of the next hour changes in consumption automatically based on the analysis and optimizations discussed herein, and no further nomination is necessary.

According in still other aspects, the system is configured to analyze and request energy from batteries/distributed generation sources. Even though it is realized that distributed generation sources are not as prevalent currently as they will be in the future, the system models distributed generation sources to optimize energy allocation and/or generation. Various examples factor in the potential role that energy contained, for example in a battery locally, or energy generated by solar panels on site, has in the module's decisions. The availability of distributed generation sources is analyzed for optimizations in both initiation of a purchase in the next day market, as well as to change consumption behavior in real time.

It is further realized that even though different entities are involved at different levels in generation, transmission, and distribution of electricity, as well as monitoring and control in the overarching power grid, there is no single standardized and integrated system that can be used to monitor and manage the electric power grid in real-time across all of its many and varied elements, limiting management options for various conventional approaches. Indeed, there is no one information management system for the power grid in total, integrated across multiple business systems, companies, and control areas, responsible for managing the security, timeliness, accuracy, or accessibility of information for grid operations, reliability, market operations, and system security.

Therefore, a need exists for improvements in management capability of the disparate systems and components of the grid. It is realized that management and efficiency in energy generation and distribution can be improved over various current approaches, for example, by implementing translation matrixes that enable full use of information captured from grid elements and/or end point energy devices regarding scheduled use and/or future preferences for consumption.

Moreover, even within a given territory (e.g., within a given ISO), various conventional systems fail to fully leverage two-way communication between energy producers and the consumers through the ISO. To the contrary, energy consumers typically request energy loads and ISOs ensure that they are provided without further interaction. For example, a given ISO will use historical information to predict when loads might be required and plan accordingly. Although such historical information may be fed into models that take into account temperature and/or other environmental factors to help refine estimates, these models are essentially static and backward looking, not taking into account customer preferences under various price scenarios.

Thus, it will be appreciated that it would be desirable to provide techniques for improving load forecasting accuracy and/or energy-related load optimization in connection with an energy grid. In this regard, it would be desirable to (a) schedule the provisioning of energy based on retrieved operation information associated with supply-side components of the energy grid, requests for energy from a plurality of end use energy consumers, and/or preferences associated with those received requests in an efficient, stable, and load-balanced manner, and (b) cause the actual delivery of energy in accordance with the schedule. Advantageously, the system can be made more stable and reliable.

One aspect provides an energy management system configured to accomplish and one or more (including any combination of elements) operations: 1) delivers location appropriate scarcity signal (e.g., wholesale pricing) to an end user drawing upon identification algorithms discussed herein; 2) delivers location appropriate energy delivery cost information derived from translation algorithms discussed herein; 3) delivers estimated (or captures actual) energy usage profiles using algorithms discussed; 4) aggregates and translates local appliance and energy production/storage information and translates into dispatch categories using algorithms discussed herein; 5) aggregates and translates customer preferences and combines with information from (4) so as to translate into optimized energy usage profiles (load profile) for potential execution instructions to the wholesale market (ISO) using algorithms discussed herein; 6) constrains all usage profiles and potential execution instructions by tariff algorithms prior to nomination to ISO using algorithms discussed herein; 7) communicates to the ISO both desired (nominated) energy usage profiles, as well as potential energy usage profiles in reaction to changes in scarcity signals and tariff constraints using algorithms discussed herein; 8) executes (or causes to be executed) such transaction instructions which optimize energy usage subject to consumer preferences, scarcity signals and tariff constraints using algorithms discussed herein; 9) modifies energy usage (production) and executes transactions during the day based upon consumer preferences, scarcity signaling and tariff constraints using algorithms discussed herein; and/or 10) modifies energy usage over time (subject to consumer approval) based upon all factors above as well as incorporation of learned behavior over time as usage history is monitored and adjusted.

One aspect of certain example embodiments relates to systems and/or methods for accomplishing these and/or other ends. Another aspect of certain example embodiments relates to facilitating two-way, and/or real-time communication between energy grid producer related systems and end use energy consumers, e.g., for current and/or future load forecasting and, thus, improved stability of the overall grid.

Another aspect of certain example embodiments relates to providing a common encoding protocol among and between energy grid producers related systems and end use energy consumers. In various embodiments, the common encoding protocol enables the system to leverage information from various energy endpoints (e.g., energy consumption devices, energy generation devices, etc.), and even end points with different communication protocols, devices providing less information, etc., to achieve improvements in modeling and improvements in efficiency for generating and delivering energy.

According to one aspect, an energy device control system executing on a distributed grid subsystem operative to control a first power demand of a plurality of appliances, the energy device control system is provided. The system comprises a graphical user interface configured to accept a user input indicative of a first demand and dynamic allocation flexibility associated with the a respective energy device, a communication interface configured to aggregate dynamic allocation values from a plurality of system nodes including at least the user input indicative of a first demand and the dynamic allocation flexibility, and at least one processor programmed to generate a learning model for evaluating dynamic future allocation with future energy execution prediction, wherein the dynamic future allocation includes at least energy operational information based on a categorization of energy usage at a plurality of respective energy devices, and trigger energy generation on the energy grid at respective generator nodes according to the learning model and dynamic projections.

According to one embodiment, at least one processor is further configured to assign categories of energy execution for a respective device as part of generating the learning model for dynamic allocation flexibility. According to one embodiment, at least one processor is further configured to assign a category of energy requirement for a respective device as part of generating the learning model for dynamic allocation flexibility. According to one embodiment, the category is selected from a plurality of categories including at least a first category for non-deferrable energy consumption, a second category for a deferrable energy consumption having a time limited window for deferment, and a third category having a longer time window for deferment relative to the second category.

According to one aspect, a method for energy device control executing on a distributed grid subsystem, the method operative to control a first power demand of a plurality of appliances is provided. The method comprises accepting in a graphical user interface a user input indicative of a first demand and dynamic allocation flexibility associated with the a respective energy device, aggregating, by at least one processor, dynamic allocation values from a plurality of system nodes including at least the user input indicative of a first demand and the dynamic allocation flexibility, and generating, by at least one processor, a learning model for evaluating dynamic future allocation with future energy execution prediction, wherein the dynamic future allocation includes at least energy operational information based on a categorization of energy usage at a plurality of respective energy devices, and triggering, by the at least one processor, energy generation on the energy grid at respective generator nodes according to the learning model and dynamic projections.

According to one embodiment, the method further comprises an act of assigning categories of energy execution for a respective device as part of generating the learning model for dynamic allocation flexibility. According to one embodiment, the method further comprises an act of querying respective devices to capture additional information.

According to one aspect, an energy device control system executing on a distributed grid subsystem operative to respond or control power demand for a plurality of appliances, the energy device control is provided. The system comprises an interface component configured to capture information associated with a first demand or a dynamic allocation flexibility associated with the a respective energy device, a communication interface configured to aggregate dynamic allocation values from a plurality of system nodes including at least the information indicative of a first demand and the dynamic allocation flexibility, and at least one processor programmed to, identify un-profiled energy devices and apply a classification learning model for classifying un-profiled energy devices into a category of energy usage including at least a first and second category of use, execute a machine learning model for evaluating dynamic future allocation with future energy execution prediction, wherein the dynamic future allocation includes at least energy operational information based on a categorization of energy usage at a plurality of respective energy devices, and trigger energy fabrication on the energy grid at respective generator nodes according to the learning model and dynamic projections.

According to one embodiment, at least one processor is configured to update the machine learning model for evaluating dynamic future allocation with future energy execution prediction based at least in part on automatically classified energy devices. According to one embodiment, at least one processor is configured to trigger energy fabrication on the energy grid at respective generator nodes according to the updated learning model. According to one embodiment, at least one processor is configured to communicate automatically generated profile information to a respective energy device for confirmation. According to one embodiment, at least one processor is configured to monitor usage patterns for deviation from automatically generated profile information and redefine categorization of the energy device consistent with monitored usage patterns.

According to one embodiment, responsive to determining the operation lacks information, that at least one processor is further configured to trigger a query to capture additional information and complete the standard format for the respective communication.

Corresponding methods and non-transitory computer readable storage mediums tangibly storing instructions for performing such methods also are provided by certain example embodiments, as are corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 27 is a block diagram showing example components of an energy device control system, in accordance with an example embodiment;

FIG. 28 is a block diagram showing example components of an energy device control system, in accordance with an example embodiment;

FIG. 29 is a block diagram showing example components of an energy device control system, in accordance with an example embodiment;

FIG. 32 is an example a table describing scale and dispersion of data sources.

DETAILED DESCRIPTION

Figure 1:
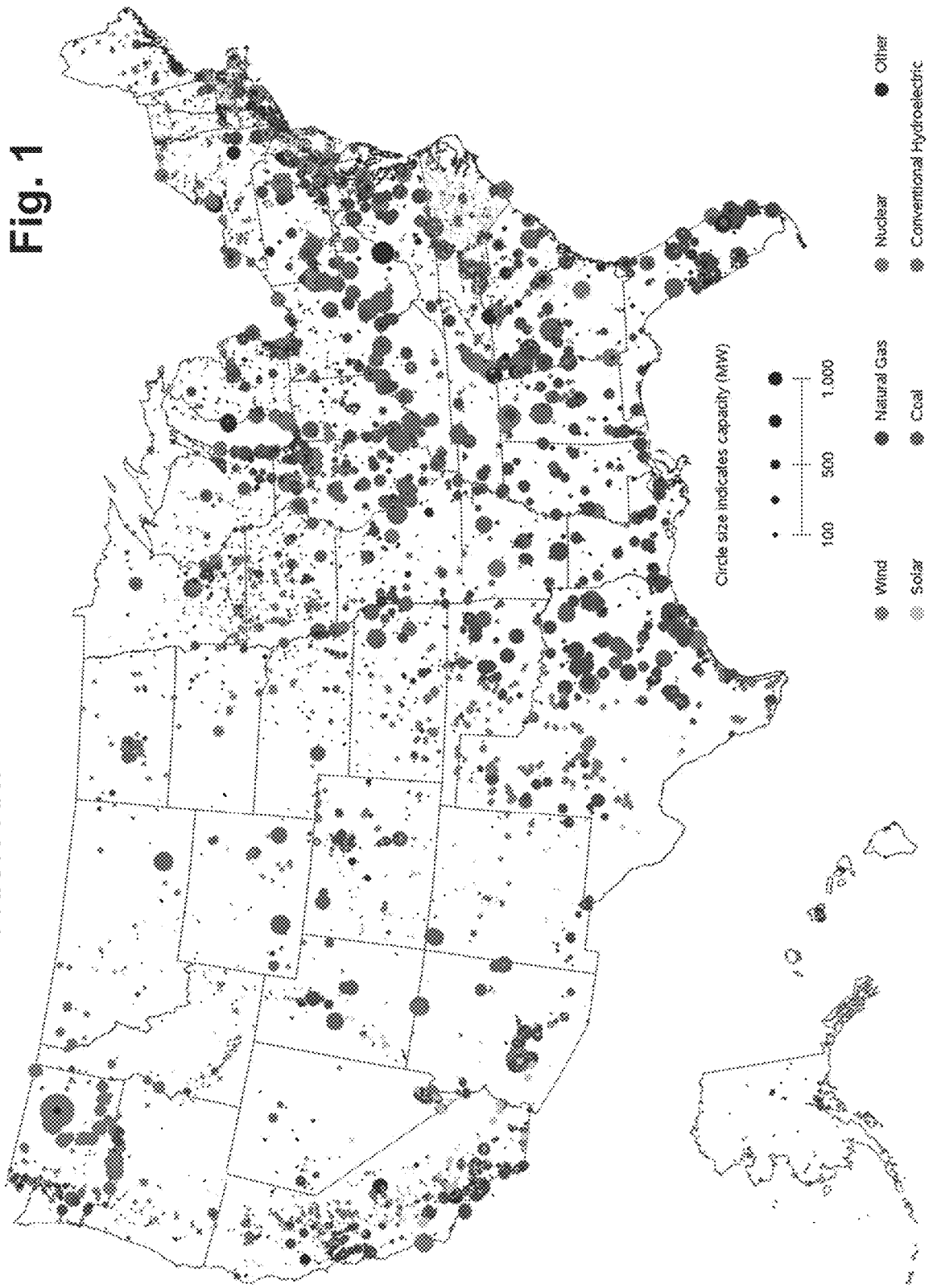
FIG. 1 is a map reporting where and how electricity is generated, and estimating capacities at each site, in accordance with U.S. Energy Information Administration data.
Figure 2:
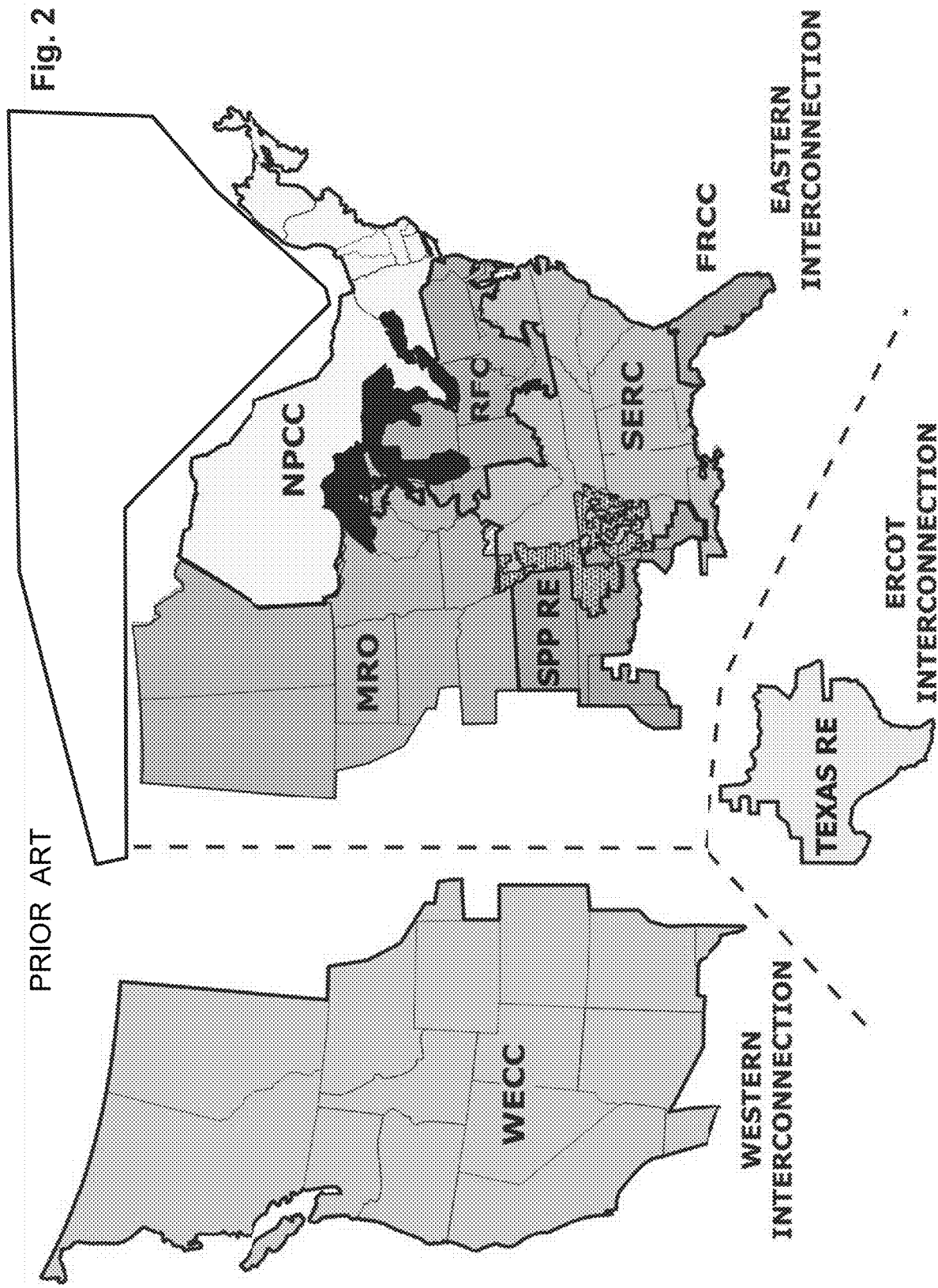
FIG. 2 is a historical map preceding the evolution of ISOs showing interconnections between the eight Regional Entities in the Electric Reliability Organization (ERO) Enterprise.
Figure 3:
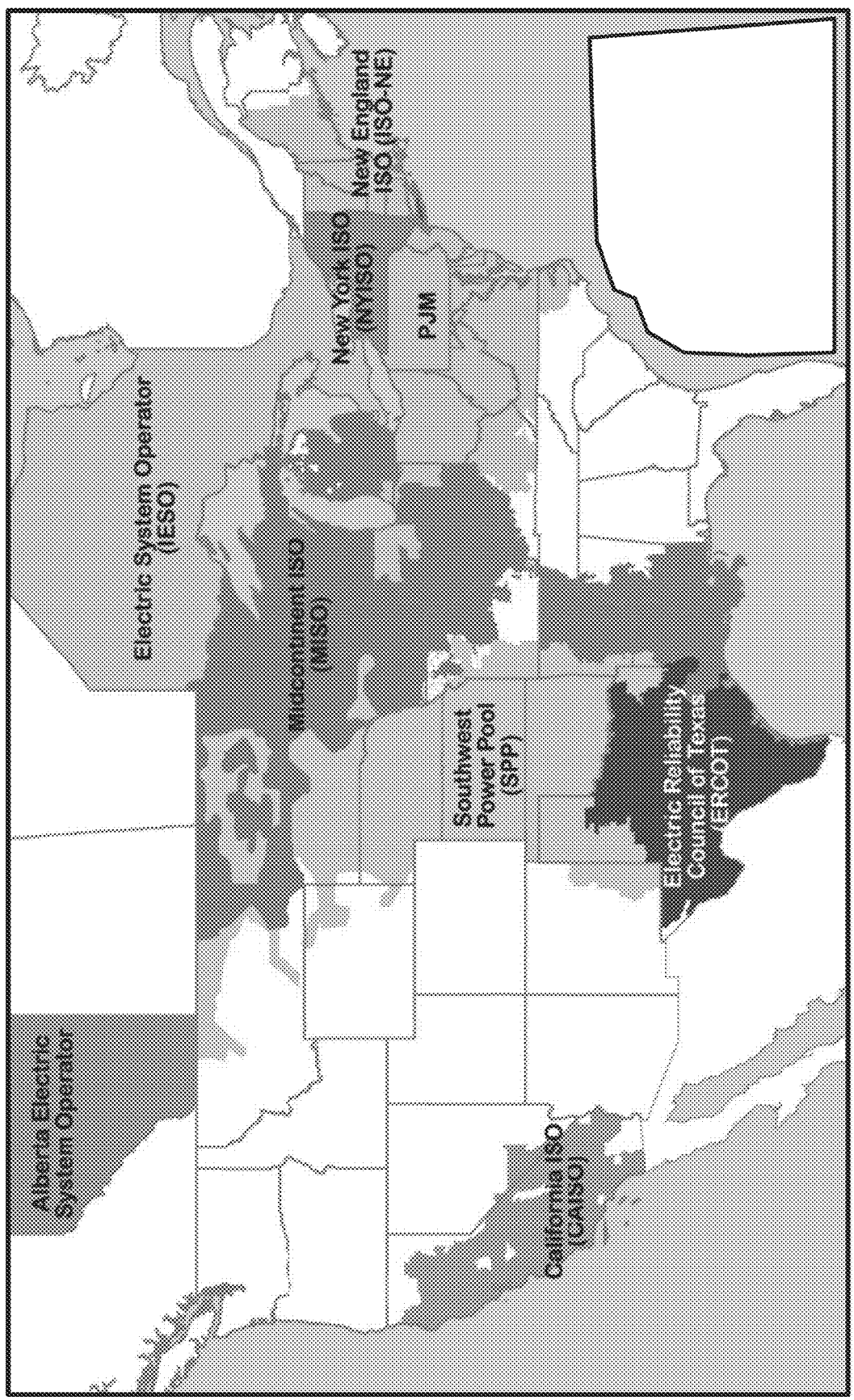
FIG. 3 is a map showing Independent System Operators (ISOs)/Regional Transmission Organizations (RTOs) currently operating in North America.

Certain example embodiments relate to improved systems and/or methods for load forecasting accuracy and/or energy-related load optimization in connection with an energy grid. Various embodiments enable more efficient modeling and/or energy generation over many conventional approaches. The energy grid includes centralized grid management systems (e.g., Independent System Operators or ISOs, Regional Transmission Organizations or RTOs, etc.) and distribution nodes connected thereto. Operation information associated with components of the energy grid is retrieved, via an electronic interface, with the operation information including data relating to a location and a value for the associated components. The operation information has a native format that varies based on its source.

According to one embodiment, predefined rules from a predefined rule set are programmatically applied to the retrieved operation information to translate it from its native format into a standardized format. In at least some instances, the standardized format includes location data and standardized value data that is more granular in detail compared to the corresponding retrieved natively formatted operation information. For example, in some instances, natively formatted data may be provided at a nodal level whereas nodal level information may be inferred, computed, or otherwise obtained from the natively formatted data. In another example, incomplete information can be identified in incoming information, automatically triggering automatic queries on the reporting device and/or on devices at the same location as the reporting device. In a further example, the system can infer incomplete information from historic information or based on analysis of similar devices.

According to some embodiments, the rules from the rule set that are applied are selected for application based on the source and content of the operation information. For instance, different rules may be applied for different ISOs, e.g., to take into account different reporting formats provided by different ISOs, etc. In another example, different rules can be applied to different devices, for example, to translate information into a common format or complete incomplete information in the communicated data. In some examples, requests for energy loads and preferences associated with those requests for energy loads are received from end user energy consumers. The requests for energy loads may be generated automatically in some instances (e.g., an appliance such as a dishwasher may be set to run and therefore may automatically generate and transmit a request or cause a request to be transmitted). Preferences may also be set by an end user and may indicate flexibility with respect to the load. This flexibility may be indicative of a different time to actuate an appliance, a number of degrees to raise or lower a thermostat that may or may not be tied to external weather conditions, etc. In other embodiments, the system can supply recommendations for setting a category of energy consumption flexibility (e.g., similar device modeling, analysis of user preference on other devices at a location, etc.). In yet other embodiments, the system can automatically set a category for energy consumption flexibility, which can be overridden by an end user.

Based on the received requests, preferences associated with the received request, and the standardized location data and standardized value data, a schedule is developed for the provision of energy from the energy grid to the end user energy consumers, via one or more of the centralized grid management systems. This scheduling thus is automated and standardized, and its accuracy is facilitated and improved over various conventional approaches based on two-way interactions between the centralized grid management system(s) and the end user(s), which in turn improves future forecast accuracy, balancing of current-day load, etc. Delivery of energy in accordance with the scheduled provisioning is triggered, regardless of the transactional protocol(s) implemented (e.g., automatic translation can be executed to achieve improvements in efficient operation (e.g., even in devices formally unmanageable under conventional approaches)) by the one or more of the centralized grid management systems associated with the scheduled provisioning relative to conventional approaches. In this way, the overall health of the system can be better assessed and managed.

In certain example embodiments, a similar approach can be used to provide energy from end user consumers back into the grid. For instance, an end user may have stored energy in batteries, may be able to provide energy from building integrated photovoltaic (BIPV) devices such as solar panels or the like, etc. This energy may be provided back into the grid, e.g., for use by another end user. In such cases, offers to provide energy and preferences associated with those offers may be provided to the grid operator by end users who wish to either curtail their consumption or deliver energy they have produced and or stored (ex. solar panels and batteries). Scheduling of that provisioning may be carried out in a similar way, e.g., based on the received offers, preferences associated with the received offers, and standardized location data and standardized value data. Requests for energy loads from different end users additionally or alternatively may be taken into account. Once the schedule is devised, delivery of energy in accordance with the scheduled provisioning may be triggered.

In certain example embodiments, centralized scheduling information may be derived and that scheduling information may be transmitted to the centralized grid management systems to prompt the centralized grid management systems to potentially better forecast future loads and balance delivery of current-day loads.

Figure 4:
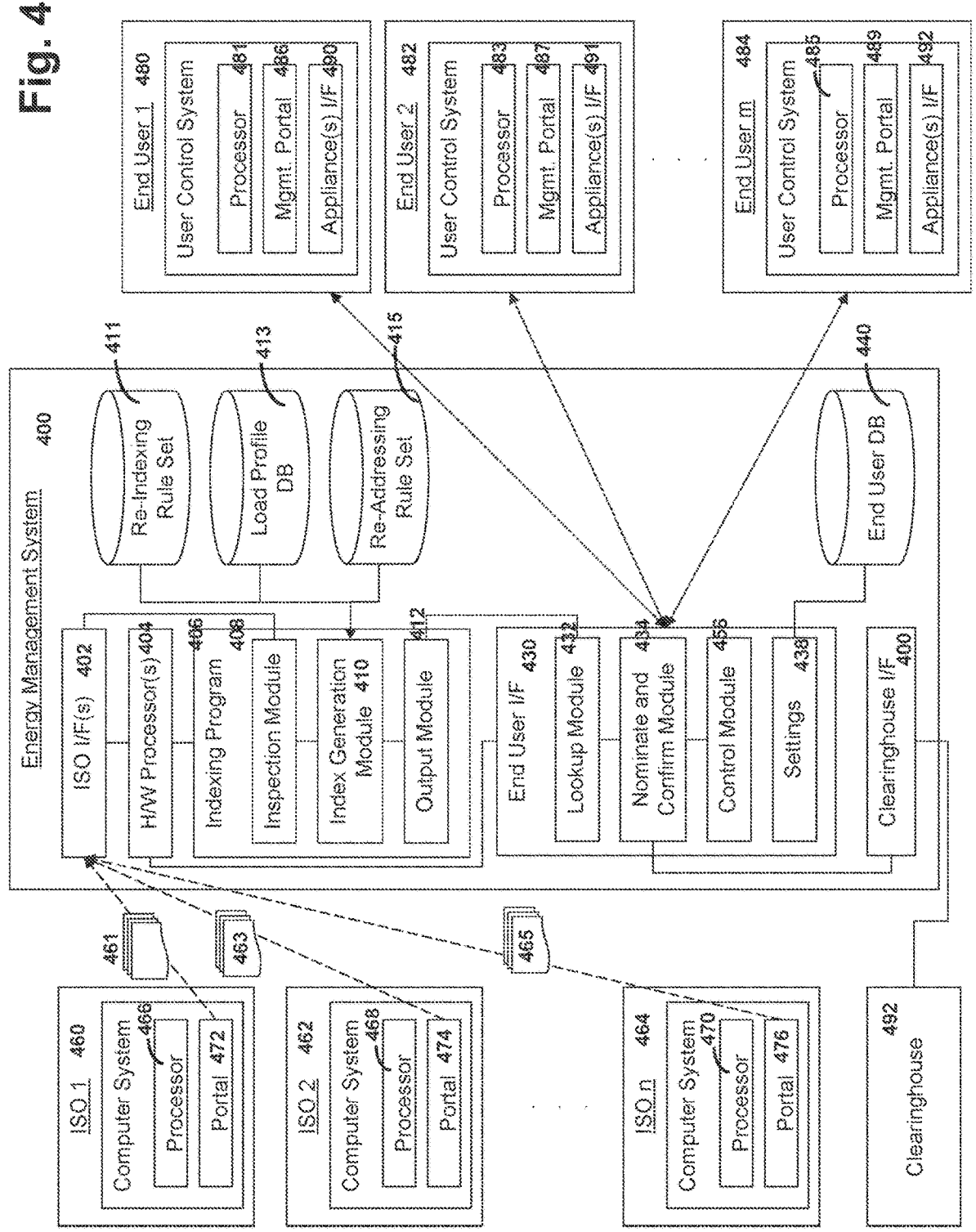
FIG. 4 is a block diagram showing example components of an energy management system interacting with ISOs and end user systems, in accordance with an example embodiment.

Referring now more particularly to the drawings, FIG. 4 is a block diagram showing example components of an energy management system 400 interacting with ISOs (e.g., 460-464) and end user systems (e.g., 480-484), in accordance with an example embodiment. FIG. 4 shows an energy management system 400 interposed between a plurality of ISOs and a plurality of end users. Although ISOs are shown in FIG. 4, and although the examples discussed herein primarily reference ISOs, it will be appreciated that other centralized grid management systems responsible for managing energy production, load, and/or transmission for a respective defined portion of the energy grid, may be provided in addition, or as an alternative, in different example embodiments. According to one embodiment, the ISOs are responsible for both economic dispatch and grid operations of all physical wholesale components including; generation, transmission and wholesale distribution. In some examples, the ISOs operate respective computer systems that include processing resources including hardware processors (e.g., 466-470) and provide portals (e.g., 472-476) to data. According to various embodiments, these portals enable the energy management system to communicate data (e.g., retrieve or receive data 461, 463, 465, etc.) associated with generation and load prices at different locations served by the ISO. In some instances, this information is provided at a nodal level. In other instances, aggregated information may be retrieved. The term portal is used broadly and is intended to cover the various means by which ISOs and other entities make or could make their data available. For instance, some ISOs may provide public application programming interfaces (APIs) that can be called by the energy management system, whereas other ISOs may provide data in a defined format (e.g., via a CSV or other delimited file format, in a database format, etc.). Still other ISOs may publish information online, e.g., to a webpage or the like, and the energy management system may scrape this information periodically and/or on an as-needed basis (and potentially in real-time).

Although it would seem simple to retrieve information from ISOs, different ISOs report different amounts and types of data in different ways, including using different protocols.

Currently, each of the ISOs operates its own open access website, part of whose function is to publish prices for generation (e.g., such data can often be incomplete or inconsistent with other ISOs' sites) and the cost to serve load on their respective system. This pricing typically occurs for at least two time periods of duration; Next Day (discrete price by hour for the complete 24 hour period beginning at 00:00 and ending 24:00), and Real Time (next immediate hour). The lowest levels of aggregation for pricing of load occur at the bus, or substation, level for load, and at each generator at its injection point into the grid. Unlike generator prices, bus prices are typically aggregated into higher level indices and weighted by each point's share of load, typically called zonal pricing, which usually is the price end users actually pay. This is analogous to an individual stock forming part of a stock Index and weighted by its capital value (cap-weighted). Individual bus prices may also be aggregated into hubs or other virtual prices that are cash settled. In addition, each ISO has its own naming convention for prices, which may or may not describe the physical location of the asset. For example, whereas NEISO reports the prices at its Acushnet, MA substation under the code "LD.ACUSH-NET13.2", PJM reports pricing at Commonwealth Edison's Fermilab substation in Warren IL as "Code: 32408783" and Common Name "W407-4". In addition, the linkages of these bus prices for load to their respective zone (index) varies across ISOs. For example, in the Acushnet example cited earlier, NEISO publishes a Price Node Table that clearly identifies "LD.ACUSHNET13.2" as being part of the SEMA Zone with a Zone ID of 4006. This is contrastable with MISO, which considers the relationship between a given Price Node (EPNode) to its Zonal Price (CPNode) to be "proprietary" and thus unavailable. According to various embodiments, the system is configured to dynamically develop such incomplete information (e.g., a statistical analysis can be executed to estimate this pricing relationship between a member of the index and the index itself). For example, through this analysis, the system can determine that the Load Node of "L EAI MELTON T1" was actually part of the Load Zone "EAI.JONSCWL", or Entergy Arkansas Jonesboro City Water and Light's service territory. In various implementations, the system can dynamically, periodically, a-periodically re-analyze relationship, load, and/or pricing information to maintain a complete data model and ensure that consumers are provided the most accurate allocation based upon their locations and respective local variables.

Certain example embodiments draw upon a wide variety of approaches to accurately translate ISO node data into the correct pricing series, as well as physical location of each respective asset. In various examples, the system analyzes a multitude of public sources (e.g., including, FERC and SEC and State Regulatory filings, newspaper articles, historical records, deeds and surveys, lawsuits, and other sources) to maintain data models for optimizing energy generation and delivery. In other examples, statistical analysis is used (including for example, regression modeling, and other approximation techniques).

Figure 5:
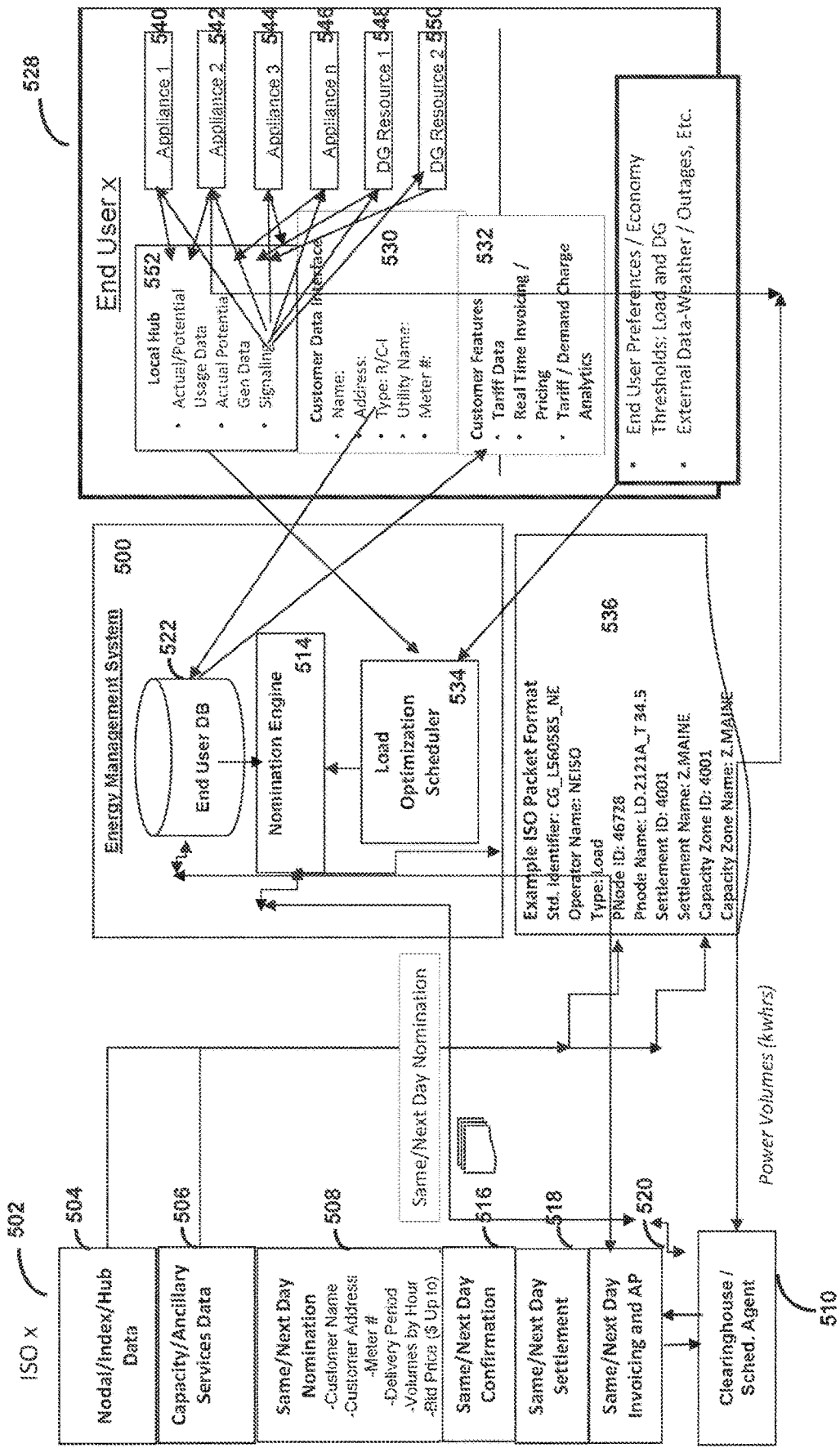
FIG. 5 shows additional functional detail for a portion of the FIG. 4 block diagram, in accordance with an example embodiment.

After translation of ISO nodal codes into common names and physical locations in order to access pricing data where a user refers to natively formatted price nodes and whose conventions vary greatly across ISOs as noted above. In order to make this data more accessible and intuitive for the many constituents who wish to programmatically refer to relevant pricing, the system has adopted and implements its own coding convention as seen in FIG. 5's "ISO Packet Format". In this case New England ISO (NEISO)'s natively referred to as "LD.2121A_T 34.5" which refers to Larrabee Road Substation, at address; 198 Larrabee Road, Lewiston, ME 04240, has been given the code CG_L560585_NE. This convention first describes the system id "CG", then "L" for Load, then a unique numerical identifier "560585", and then the ISO, "NE". It can be appreciated that this convention is standardized across ISOs in various embodiments so as to make referencing both more intuitive and accessible.

In one embodiment, after the system extracts the raw price node and zonal data, the Next Day set of prices are weighted by an estimated "load profile" so as to account for greater usage of electricity during the day and hence greater weight applied to those hours relative to late night, for example. This estimation procedure is somewhat unique to each location and can be configured to produce just one (instead of 24) set of load-weighted prices for the following day. This example execution is in contrast with conventional market approaches in which pricing is commonly done for "blocks" of energy for specific "peak" or "off-peak" hours making comparisons between wholesale and retail prices extremely difficult if not infeasible.

According to one embodiment, the estimate procedure analyzes baseline daily and seasonal baseline estimates from the National Renewable Energy Laboratory (NREL) by city and type of consumer (residential or commercial) which enables the system to model an hourly consumption estimate (load profile) and use the model for downstream consumption estimates.

The cost that a utility incurs to deliver electricity to a given customer incorporates pricing for nodes (zones) for the energy delivered as described above, as well as capacity and certain ancillary services that ensure reliability and stability of the system. Certain example embodiments accurately capture and/or estimate where unavailable the cost of these additional services. According to various embodiments, the system ensures accurate capture and/or estimation based on translation matrices to standardized values (and may include querying additional information sources to resolve incomplete date) as discussed, various examples and implementations resolve the level of variability with transparency and availability of these cost series across the various ISOs.

Figure 6:
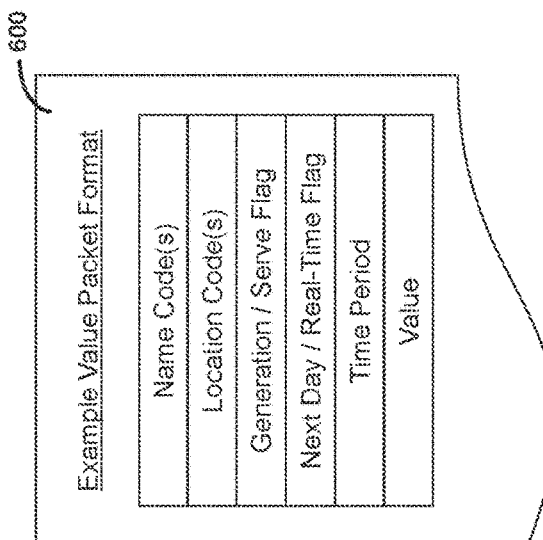
FIG. 6 is an example of a packet format that may be obtained from an ISO in accordance with an example embodiment.

FIG. 6 is an example of a packet format 600 that may be obtained from an ISO in accordance with an example embodiment. This packet format is greatly simplified for ease of understanding. FIG. 6 includes name and location codes, as well as flags indicating whether the value pertains to generation or load, and next-day or real-time (hourly) time period. The value also is included. This format, though idealized, is obtained directly or indirectly from the ISOs. The native formats obtained also may be converted into this more standardized format in certain example embodiments, e.g., for aggregation, comparison, display, and/or other purposes. Indeed, the standardization of disparate types of data may be useful in comparing values so that scheduling can be performed more reliably for a given ISO and potentially across ISOs, and in some examples, with less industry specific knowledge required. According to various embodiments, by standardizing the formats, and reducing aggregated data to understandable and usable nodal data, as described previously, the system is able to more accurately perform scheduling for energy generation and load purposes relative to various conventional systems. This scheduling may be performed at the energy management system on behalf of the ISOs (e.g., using scheduling algorithms customized or otherwise appropriate for the different ISOs) and sent back to the ISOs so that they may more proactively estimate energy load and generation requirements, and make adjustments to help promote grid stability and reliability. According to various embodiments, as the schedule becomes better known, real-time and forecasted needs become more concrete, and the system is configured to alter the status of the grid as a whole, resulting in significant technological improvements to the operation of the grid as a whole, as well as the portions of the grid managed by the ISOs.

Referring once again to FIG. 4, the energy management system 400 receives data from the ISOs via an ISO interface (e.g., 402). With the aid of processing resources, including one or more hardware processors and memory (e.g., 404), an indexing program 406 is run. The indexing program 406 is configured to inspect incoming data from the ISOs via an inspection module (e.g., 408). According to one embodiment, the inspection module 408 is configured to determine what format the data is in. In further embodiments, the inspection module can analyze received data to determine if the data is complete and needs translation to a common format, and/or analyze received data to determine if the communicated information is incomplete. Identification of incomplete information can trigger queries to the ISO or other public sources to establish the incomplete data, approximate the incomplete data, among other options. The inspection module can be configured to pass received data to the indexing module (e.g., 410) which is configured to generate an index from the retrieved data. Generation of the index can be facilitated by accessing and analyzing a re-indexing rule set (e.g., 411), a load profile database (e.g. 413), and a re-addressing rule (e.g., 415) sets.

According to some embodiments, each rule set includes rules that aid in understanding the data sent from the ISOs. Where appropriate, the rules in the rule sets provide instructions for translating the natively-formatted information into information usable by the energy management system. In some examples, the rule sets can include queries to execute and/or references to query to complete received information (e.g., pre- or post-translation). In some instances, the system is configured to identify and execute rules related to understanding what the data relates to (e.g., load or generation, zonal data or individual nodes, etc.) and how to translate that data into something meaningful for the system (e.g., accept node level data after standardizing location information, aggregate zonal information to standardize it, etc.). According to some embodiments, the rules are executed based on optimizing generation, load, and demand, coupled with forecasted need, price, and/or user categorizations of use. Various examples of the analysis executed by the system and discussed herein. According to one example, the load profile database includes historical data for weighting the value information extracted from the information received from the ISOs. This information is processed, and an index is generated and stored, e.g., to a non-transitory computer-readable storage medium of the energy management system, and/or provided to an in-memory data location so that it can be consulted. Various embodiments include an output module for communicating or enabling access to indexes and/or rules to apply to data as well as outputs generated.

According to various embodiments, end users may be commercial and/or residential users in different example embodiments. Each end user location includes a control system or smart hub. Smart hubs include processing resources (including at least one processor and a memory) and interfaces to load-consuming devices at the location. For a home location, this may include, for example, a connection to an end-appliance (e.g., 490-492) such as, for example, a dishwasher, washing machine, thermostat, HVAC system, etc. It also may include a connection to another hub or integration system already at the location such as, for example, a NEST system for thermostat and/or other control of items in a house, a building management system, etc. A management portal (e.g., at 486-489) can be provided so that a user can interface with the energy management system.

The management portal interfaces with the end user interface provided at the energy management system. The portal may be used in connection with a computer or mobile device accessing a webpage, dedicated app, or the like. The end user interface (e.g., 430) on the energy management system 400 is configured to receive data from and provide data to end users. For example, a lookup module (e.g., 432) can be configured to enable the user to investigate pricing information, e.g., related to the indexes derived as noted above. A user can nominate and confirm purchases using a corresponding module (e.g., 434) configured to interact with an end user, receive nomination information and confirm purchases (e.g., via the nominate and confirm module 434), among other options.

In some examples, the user also can provide preferences related to purchases. For example, a user may specify a willingness to adjust a thermostat up 3 degrees in the summer if it will save a given amount of money, a user may indicate a willingness to run a washing machine at a particular time if the price is lower, etc. According to some embodiments, system 400 includes a control module 436. In one example, the control module is configured to communicate control signals to end users devices or end users control hubs. For example, the control module therefore may interact with the end user control system and/or associated hubs to cause related actions to take place. In some instances, direct control of the device (e.g., adjusting a thermostat) can be executed by the control module 436. In other instances, the control module can be configured to send an electronic message (e.g., SMS message, email, push notification, and/or other message) to a user to prompt the manual actuation of a given device at a time. In various embodiments, preferences can be saved as settings (e.g., 438), historical information may be stored to an end user database (e.g., 440), etc.

In some embodiments, an optional clearinghouse (e.g., 442) may aid in billing and/or other services, via a clearing house interface (444) or API. It will be appreciated that in FIG. 4, connections between the clearinghouse, the end users, and the ISOs according to various embodiments are not shown for the sake of simplicity. In some embodiments, a clearinghouse serves as an intermediary between the system and the ISO, in some cases other intermediaries may be involved, e.g., REPs, brokers, scheduling coordinators, etc.

In further embodiments, the system can be specifically tailored to model and/or forecast energy needs (e.g., generation, consumption, time-shifting, etc.) based on a plurality of consumption models or categories.

Gross Consumption Model: in various instance, the gross energy consumer model applies to the majority of energy customer currently. They are served entirely from the wholesale electric grid. In this case the Energy Management System anticipates demand of all devices subject to preferences and conforms consumption as dictated by constraints (or absences of constraints) on the part of Grid operators. For example, as discussed herein the devices that the consumer uses can be profiled and/or categories to optimize energy consumption and build information on future needs for grid supply. each device that Distributed Generation Model: For example, in the distributed generation model and end user had facilities for energy generation at the customer's own premise (e.g., solar panels, wind turbines, hydro, or other form of energy production). In various embodiments, the energy management system builds forecasts and/or generates consumption modeling based on the generation potential available at the customer location. For example, the system can generate a net consumption profile (e.g., while a producer the customer is or close to a net consumer of energy from the grid). Under this model, the system captures information on the customer's "devices," which includes energy generation devices. The associated profiles for the devices and/or the customer define preferences regarding, for example, energy use, timing, expense, etc. as well as optimization options for energy generation (e.g., greatest potential value, etc.). In various implementations, the system and/or or the forecast models account for both the consumption and generation devices as well as the preferences defines for each (which for example can include system defined preferences and/or categorization for optimizing use). In various embodiments, the system further refines the modeling of devices, production and consumption based on defined tariffs (e.g., energy production specification and supply/use value definition establishes therein). As the applicable tariff can change from region to region, the system dynamically adjusts modeling to account for such variability. In various examples, the defined tariffs structures can be established by net metering or demand response filings.

Storage (e.g., battery) Model: In various energy delivery settings, constraints on the electric grid and grid operators' need to maintain adequate capacity to serve customers at peak periods leads to dramatic differences in signaling between different hours of the same day. In some setting, such differences coupled with advances in storage technology make the siting of, for example, battery storage at the costumer's location compelling under the control of embodiments of the energy management system. For example, the energy management system is configured to incorporate the potential to inject energy during specific hours of the day into a battery and then withdraw during later hours of the day. In this way the larger operations of the grid may be normalized (e.g., inject at low consumption interval and return during high periods of consumption), and thus the system and the consuming customer are configured to more efficiently manage overall energy consumption without disruption or need for modification in existing architecture. As in other cases, tariff constraints as manifested in both signaling of energy constraints as well as peak usage (demand charges) are incorporated into the resulting consumption profile of the customer with storage.

Distributed Generation and Storage (e.g., Battery):According to various embodiments, it is understood that for certain forms of distributed generation (e.g., wind and solar) may be intermittent. It is also appreciated that storage devices may be sited on the customer's premise as described above. In these cases, as before, the energy management system is configured to incorporate both the generation and storage potential subject to preferences which will result in the best state of overall grid management while meeting the consuming customer's needs. It is also appreciated that tariff constraints affecting net generation for hours of the day (net metering) will be incorporated into the final consumption profile of the consuming customer. As in other cases, various embodiments are configured to analyze and optimize against tariff constraints as manifested in both signaling of energy constraints as well as peak usage (demand charges) are incorporated into the resulting consumption profile of the customer with storage.

According to some aspects, the system and various models are configured to analyze and account for the costs of installing and operating both distributed generation (solar) and storage (battery) devices. For example, cost analytics are embedded in the modeling generated by the energy management system. According to one embodiment, solar forecasts can be made by the system specific to the location of the customer (e.g., more daylight in northern region during rather than in southern regions, etc.). In some examples, the system is configured to infer or extrapolate various costs from market definitions (e.g., offering prices) or in various ISO or tariff data. According to some embodiment, the system can evaluate operations cost as part forecasting or optimizing energy requirements.

FIG. 5 shows additional functional detail for a portion of the FIG. 4 block diagram, in accordance with an example embodiment. As shown in FIG. 5, the ISO provides nodal, index, and/or hub related data (e.g., 504) to the energy management system (500), along with data about capacity and/or ancillary services (e.g., 506). Same day and next day nomination (e.g., 508) can be processed at the ISO (e.g., 502), e.g., for energy-related transactions that are not mediated via the energy management system (500) and in other examples, for those that are (e.g., based on signals from the energy management system, including from the centrally located nomination engine). In some cases, the clearinghouse/scheduling agent (e.g., 510) cooperates with the ISO (e.g., 502) to execute generation and delivery of energy, as well as mange end point devices. In various embodiments, the energy management system can include a nomination engine (e.g., 512) or nomination module configured to act on data including customer name, address, meter number, delivery period, volumes (e.g., by hour), bid price, etc. Confirmation (e.g., 516) and settlement modules (e.g., 518) also are provided and work with the nomination module to manage generation, delivery, and optimization of the same. Various embodiments can also include invoicing services via an invoicing module (e.g., 520) also are run through a module at the ISO.

Some embodiments of the energy management system 500 include an end user database 522, which is configured to receive information from the end user sites 528. For instance, the end user database 528 may receive customer information such as, for example, name, address, residential/commercial flags, utility names, meter numbers, etc., over a customer data interface (e.g., 530). Customer features provided through a portal may include, for example, tariff data, real-time invoicing/pricing, generation capability, storage capability, analytics related to tariffs/demand, etc. (e.g., shown at 532). In one embodiment, a centrally located load optimization scheduler 534 is also configured to receive end user preference information, as well as external data relevant to and matched up with users. For example, this external data may include weather reports, information about power outages, etc. The external data may be provided by the end user (e.g., through the hub (e.g., 552)), and may be obtained from an external resource (such as a weather information provider, utility for outage information, etc.) using the end user's location as a lookup code or the like, etc. Other examples include local hub 552 configured to capture information from various end user devices (540-550) and configured to communicate management signals to the respective devices.

A more detailed example standardized packet is included in FIG. 5 at 536. This packet is built from data retrieved from the ISO and is understandable by the system. It includes a standardized identifier, operator name, type flag (e.g., load or generation), price node id and price node name, settlement identifier and settlement name, capacity zone identifier and capacity zone name, etc.

End user sites also include links to appliances (e.g., 540-546) as noted above, as well as distributed grid resources (e.g., 548-550). These distributed grid resources may include, for example, solar, wind, or other power generators, e.g., that are capable of providing energy back into the grid. It will be appreciated that preferences can be set with respect to an end user's willingness to provide energy back into the grid from a distributed grid resource in much the same manner was as a user can provide preferences for receiving loads. Various embodiments, incorporate specified preference for future energy delivery by DG Resources into the optimization model.

Figure 7:
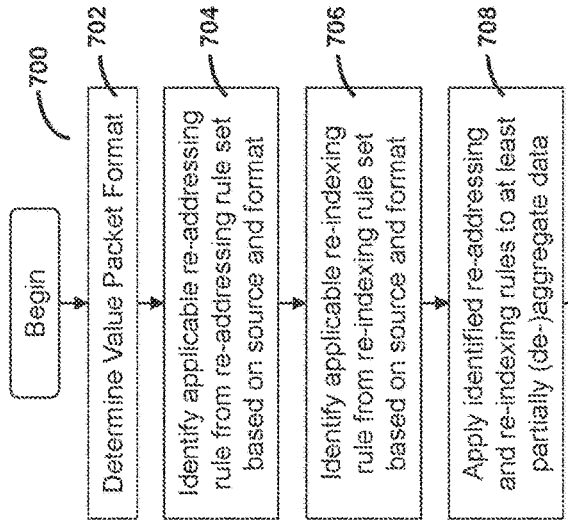
FIG. 7 is a flowchart demonstrating how an index can be generated, in accordance with an example embodiment.

FIG. 7 is an example process flow 700 showing how an index can be generated, in accordance with an example embodiment. Packets are received from ISOs and a format of the packets is determined at 702. Applicable re-addressing rules from re-addressing rule set are identified based on the source and format at 704, and applicable re-indexing rule from the re-indexing rule set are identified based on the source and format at 706. Re-addressing and re-indexing rules are applied to at least partially de-aggregate data and/or aggregate data as necessary, e.g., to build the index at 708. A determination is made as to whether data is available for raw nodes and zones. If it is not 710 NO, the data is saved and further collection is carried out, as appropriate (e.g., at 716. On the other hand, if there is sufficient data available 710 YES, the raw node and zonal data is weighted in accordance with the estimated load profile at 712. According to one embodiment, capacity and ancillary reliability and stability features are factored into the index at 714. Then, the data is saved, and collection of further packets can continue, as appropriate.

Figure 8:
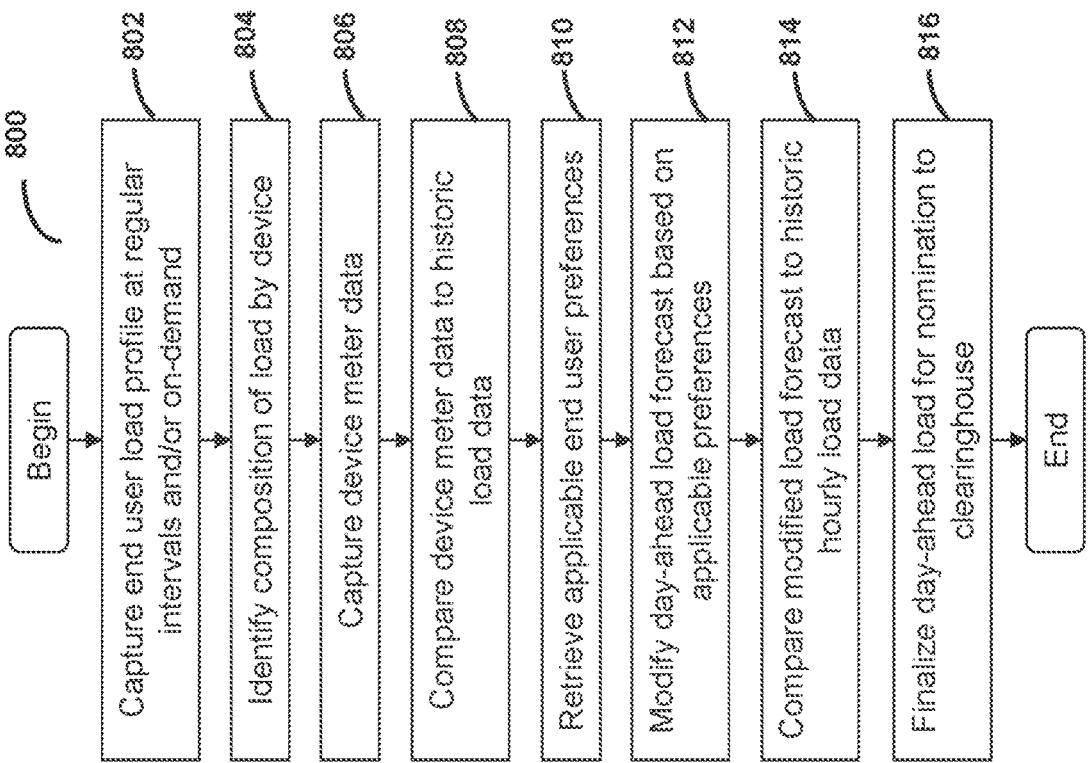
FIG. 8 is a flowchart showing an example process for load forecasting and/or day-ahead nomination, in accordance with an example embodiment.

FIG. 8 is a flowchart showing an example process for load forecasting and/or day-ahead nomination, in accordance with an example embodiment. End user load profile information is captured at regular intervals (e.g., hourly) and/or on-demand. The composition of the load is identified by device (e.g., dishwasher, clothes dryer, HVAC, etc.). Device meter data is captured, and compared to historic load data. Applicable end user preferences are retrieved, and the day-ahead load forecast is modified based on applicable preferences. The load profile optionally may be modified for temperature, day of the week, holiday, device meter data, and/or other factors. With respect to preferences, those values allowed to vary may be determined. This may include information concerning temperature modifications (e.g., set a range of range 72-80 degrees and change if savings >$10 over 4 hours), load shifting (e.g., the dryer can run between 8pm-8 am, an electric hot water heater should be inactive from 11 pm-7 am), etc. These customer preferences are captured, and the day-ahead load forecast is modified accordingly. The modified load forecast is compared to historic hourly load data, and the day-ahead load is finalized for nomination to the ISO clearinghouse.

Figure 9:
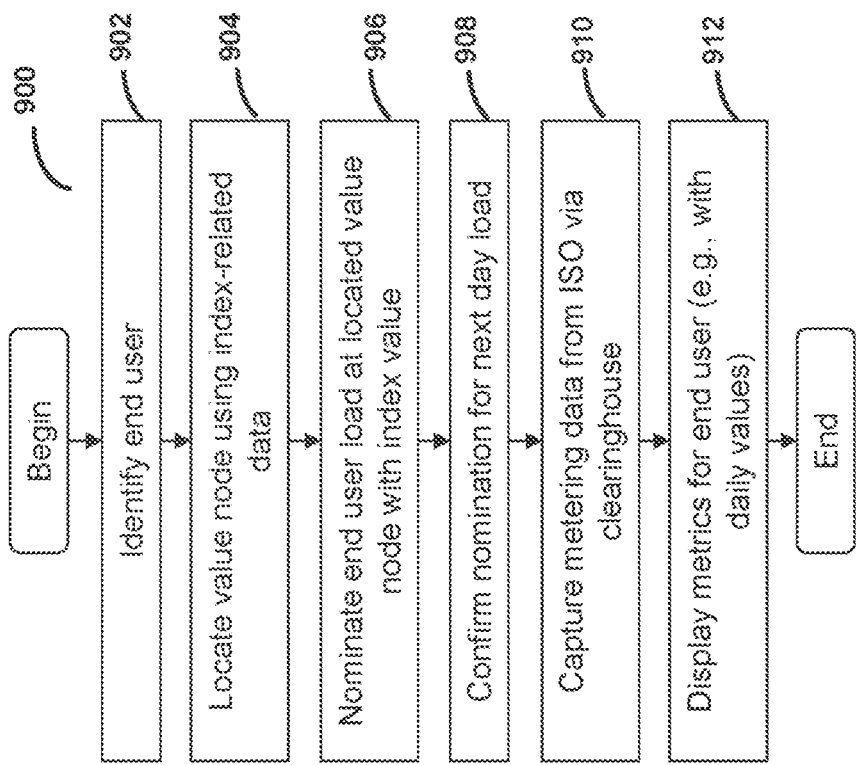
FIG. 9 is a flowchart showing an example process for day-ahead nomination, in accordance with an example embodiment.

FIG. 9 is a flowchart showing an example process for day-ahead nomination, in accordance with an example embodiment. An end user is identified, e.g., as facilitated by knowing the user's meter number, customer type (residential, commercial, industrial, etc., distribution utility, address, etc. The value node associated with that end user is identified as well. This may be performed by searching for the closest pricing node (or relevant index) (or relevant node, if other than closest), and matching the price to the energy management system's standardized code for that price. The end user's load is nominated at a local value node, e.g., with maximum value specified. According to one example, this node will be confirmed as matching the ISO's nodal database for the end user's location by the appropriate scheduling entity, (clearinghouse, distribution utility, Rep, etc.). The nomination is confirmed for next-day load. Metering data is captured from the Distribution Utility Metrics are displayed for the end user. This may include, for example, daily invoice information, etc.

Figure 10:
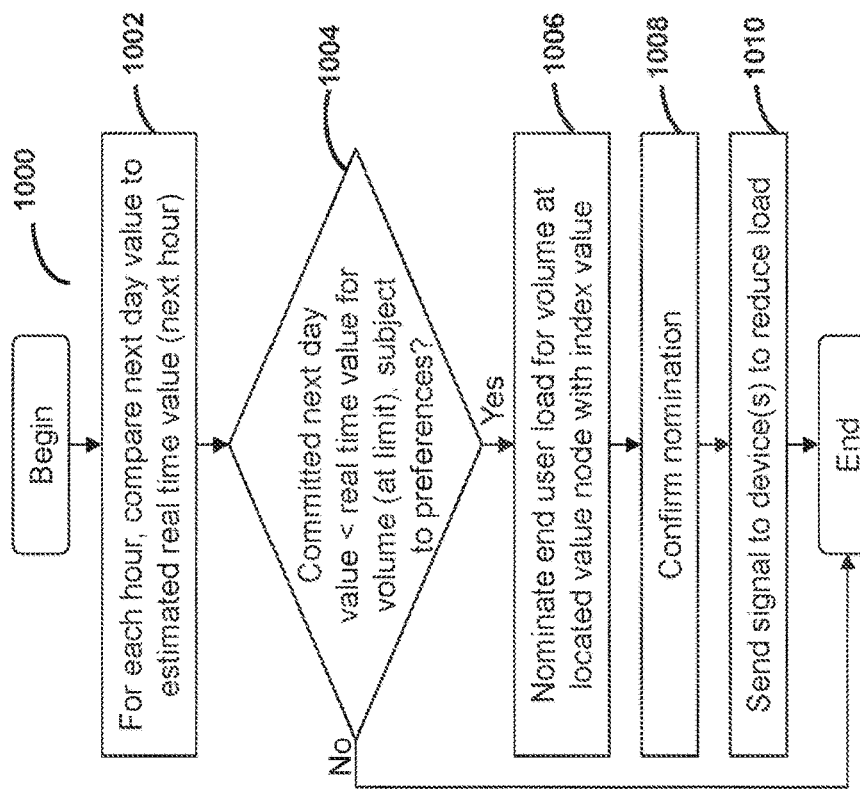
FIG. 10 is a flowchart showing an example process for real-time nomination with a reduction in load, which may be used in connection with an example embodiment.

FIG. 10 is a flowchart showing an example process for real-time nomination with a reduction in load, which may be used in connection with an example embodiment. According to various embodiments, the system is configured to reduce or shift load, subject to a price threshold. For each hour, the next day value is compared to an estimated real time value (next hour). If the committed next day value is not less than the real-time value for a volume at a savings threshold and device priority/customer preference, then no action is taken. On the other hand, if it is, then a nomination for the end user load for volume is made with the relevant value node. The nomination is confirmed, and a signal is sent to end user devices to reduce the load.

Figure 11:
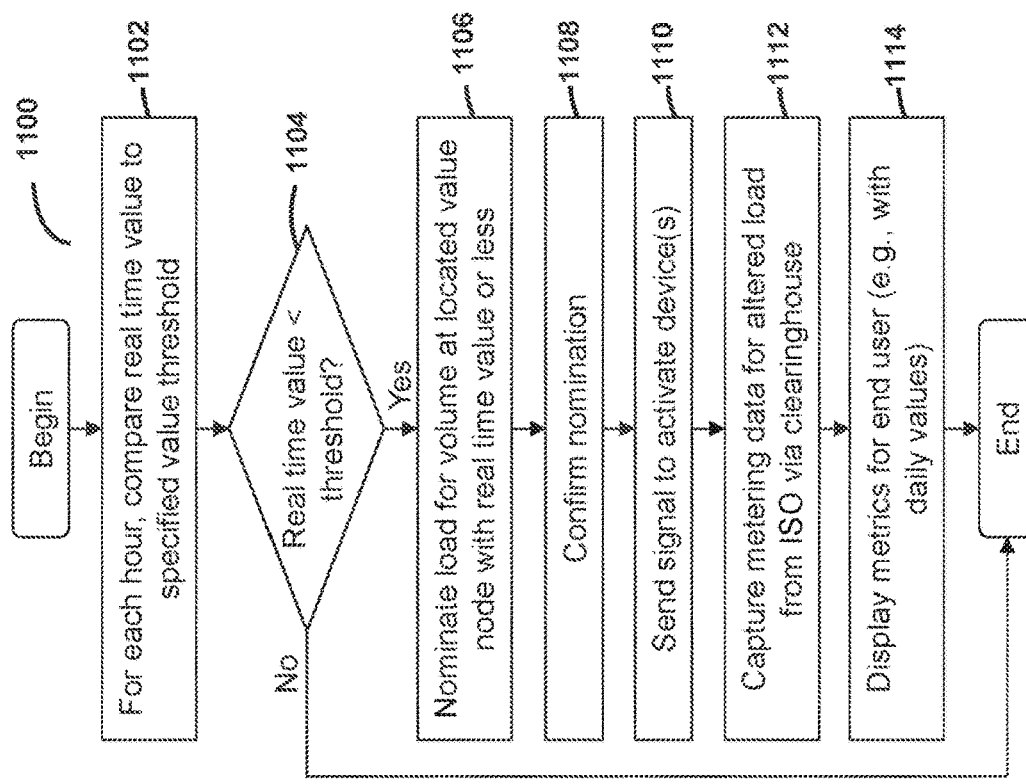
FIG. 11 a flowchart showing an example process for real-time nomination with an increase in load, which may be used in connection with an example embodiment.

FIG. 11 is somewhat similar to FIG. 10, in that FIG. 11 is a flowchart showing an example process for real-time nomination with an increase in load, which may be used in connection with an example embodiment. The idea here is to increase load, subject to a savings threshold and device priority/customer preference. For each hour, the real-time value is compared to a specified savings threshold constrained by device priority/preference. If the real-time value is not less than the threshold, then no action is taken. On the other hand, if it is, then a load for volume is nominated at a located value node in connection with the real-time value (or lower). The nomination is confirmed, and a signal is sent to one or more devices at the user's location to cause corresponding activation. Metering is captured, and metrics are displayed, e.g., as above. In certain example embodiments, it may be desirable to capture daily load weighted invoice at different zones and nodes.

It will be appreciated that the procedures in these flowcharts may in essence be inverted so that nomination of supply can be performed, e.g., at the nodal level. It will be appreciated that certain example embodiments are technically advantageous in terms of providing standardized referencing regarding location and applicable index-associated points, translating customer preferences into actionable ISO events based market transactions, and facilitating equal treatment of load and distributed generation that, in turn, facilitates transactions resulting in more efficient congestion management.

Certain example embodiment's link data from smart homes/smart devices, including IoT enabled devices, with a local execution engine that manages energy consumption, overlaid with price and preference information. The automation can be made to watch for changes to the index and purchase/sell energy based on pre-stored preferences. Customer preferences may specify a device, a timeframe of acceptability, a range of parameters that are acceptable, targeted savings, and/or the like. These preferences may be transformed into hierarchical rules, executed by the hub at the end user site and/or at the more centralized energy management system. The result of the processing can be used to actually operate devices, based on the assessment of the rule, thereby causing a change to the behavior to the devices at the end user site and a change to energy in the grid, and enabling the ISOs to better schedule load and generation, e.g., having a potential impact on overall grid health.

In addition to being able to execute real-time purchases and sales of energy, certain example embodiments enable users to run hypotheticals, e.g., a user can query what would happen by adjusting a thermostat a few degrees. Possible savings then can be presented to consumer, e.g., based on a calculation of excess energy. Moreover, based on this calculation of excess energy, the ISO can determine whether to adjust its prices, alter flow through the grid, change stability metrics, etc. Thus, hypotheticals can trigger calculations relevant to both end users and ISOs, and the results can be nominated, confirmed, metered, and billed, with the monetary and energy savings being captured and potentially used to affect characteristics of the grid.

In certain example embodiments, 15(or e.g., 5) minute pricing may be used to form the index. It has been found, however, at low latencies (including sometimes even at 15 minute intervals), the underlying price signal can fluctuate greatly. This can lead to too much volatility in the index and harm liquidity. Thus, in some instances, it may be advantageous to use index values that work with hourly data, next-day pricing, etc. By doing so, it is possible to provide more stability and liquidity to the index. This in turn enables the index to be compare against different windows, opening the possibility for software automation possibilities, and providing humans with a time to adjust their behaviors (e.g., in situations where there is less than full automation).

It is noted that the ISOs have different protocols regarding how power is scheduled in both markets and where it can settle (e.g., at the Price Node/Index/Hub), as well as what qualifies for sales back to the ISO as Demand Response or Distributed Generation. Such may be taken into account when performing the procedures reflected in the above-provided flowcharts, including when generating index values.

Distribution Utilities attempt to provide grid management, at least to some extent through the administration and design of tariffs. Charging based on the time of day (TOD) at which energy is used is a familiar example. It will be appreciated that this is a non-technical solution to technical challenges relating to grid management. It also will be appreciated that there are problems with this non-technical solution. For instance, although Utilities "publish" the rates that they charge to varying degrees, such information is not always completely transparent or provided in a way that is meaningful to end users, and in some examples, not provided at a level of granularity that can be used for on demand supply/pricing (e.g., 6 hour peaks vs hourly information). Indeed, individuals may not have insights into the full cost structure, and individuals may not have ability to act on information even if this information known based on conventional approaches.

Certain example embodiments provide a technical solution to technical problems of grid management including, for example, congestion management, stability, and parallel path flow, e.g., by facilitating coordination with ISOs in a dynamic, almost "conversational" approach. Certain example embodiments create an interface to exchange information with ISOs. This enables end users to directly or indirectly gain insights into what ISO is doing and why it is doing it. Individuals can use programmed rules to get better and more complete control, potentially taking into account real-time feedback from the grid, and the grid can be impacted by the ISOs based on real-time feedback from end users. ISOs can use this information for congestion management, parallel path flow, and overall grid stability improvements, enabling more dynamic and more precise resource utilization, and more dynamic and more precise resource provisioning. Signals thus are built based on transformed signals from the ISOs, but such signals are transformed from blunt pricing information back into more detailed information indicative of grid and resource utilization, potentially at the node level. That is, even though ISOs may in some sense obscure operational information by encoding it into price-related information, certain example embodiments are able to decode this operational information from the price-related information. These in essence decoded signals are made available to end users in the form of an index that can be acted on, providing an opportunity to leverage those improved signals into enhanced levels of precision of energy consumption.

According to some embodiments, the system provides optimizations subject to threshold and usage constraints. For example, execution of the process described in FIG. 10 demonstrates increases and decreases in load to capture value in real time markets, where the change in consumption is executed by the system based on determining that the change in consumption yields at least a minimum threshold for savings (or credit) while also conforming to aggregate daily consumption as defined by device categorization and preference. In other words, meeting a minimum optimization for energy consumption and that is achievable based on constraints imposed by associated energy providers. In one example, an electric vehicle charging may be deferred (based on system optimization) if it saves >$5 this hour—the deferred charging must still be completing before constraints specified by the end user (e.g., charged for morning drive).

Certain example embodiments involve a two-way solution, e.g., enabling users to in essence sell energy rather than just buying it. This also can aid in managing congestion on the grid (e.g., too many people using power), through discharge batteries, increase temperatures or altering other load using device parameters, etc. Aspects of certain example embodiments thus involve (a) data collection and decoding operational level data, providing price and operational transparency to the end user (e.g., more like index pricing); (b) offering end users the ability to take advantage of real-time pricing, while providing autonomous demand-side management and integration into and control over more conventional "smart technology"; and/or (c) creation of micro-grids from a consumer perspective, e.g., where an artificial intelligence model may be used for load shifting, enhancing dynamic control, and reducing lag-time between operational changes and device operations. Aspects of centralized control, security-constrained dispatch of scheduling, and management of multi-level distributed nodes help enable these concepts. Thus, rather than being nearly solely demand-side, or lightly integrating with today's smart devices, certain example embodiments move away from a more broadcast-like model and towards a more Internet-centric distributed model where there is more of a two-way conversation. The distributed system advantageously takes energy generation and load protocols and moves them into a local execution engine that is made dynamic/changeable based on user preferences.

Differently stated, certain example embodiments move from a broadcast paradigm to a distributed model, which opens up the possibility for two-way communication by linking end users and ISOs, making it possible to auto-adjust the behavior of devices on behalf of an end user. This is different from traditional demand-side management, where various conventional approach implement basically a one-way conversation (e.g., a utility and an end user agree on a contract to purchase energy in advance at the direction of the utility) and where at best there is little room for mobility within the confines of the contract (e.g., adjust temperature a few degrees and a few times, in exchange for some cost savings). Certain example embodiments do more than merely fit a software solution into a regulatory mandate in order to execute a buy command on a tariff, e.g., because certain example embodiments facilitate a two-way data exchange that enables more dynamic scheduling and provisioning of energy, e.g., based on the needs of the grid and based on the desires of end users.

According to some embodiments, intelligent modeling can be used to facilitate energy forecasting, device classification, etc. In one example, a machine learning model is trained on existing customer data to enable end user devices to be classified automatically into categories of use with associated use preference. In these examples, the system can automatically develop preferences for device use and/or energy consumption even where individual users fail or refuse to do so.

Figure 12:
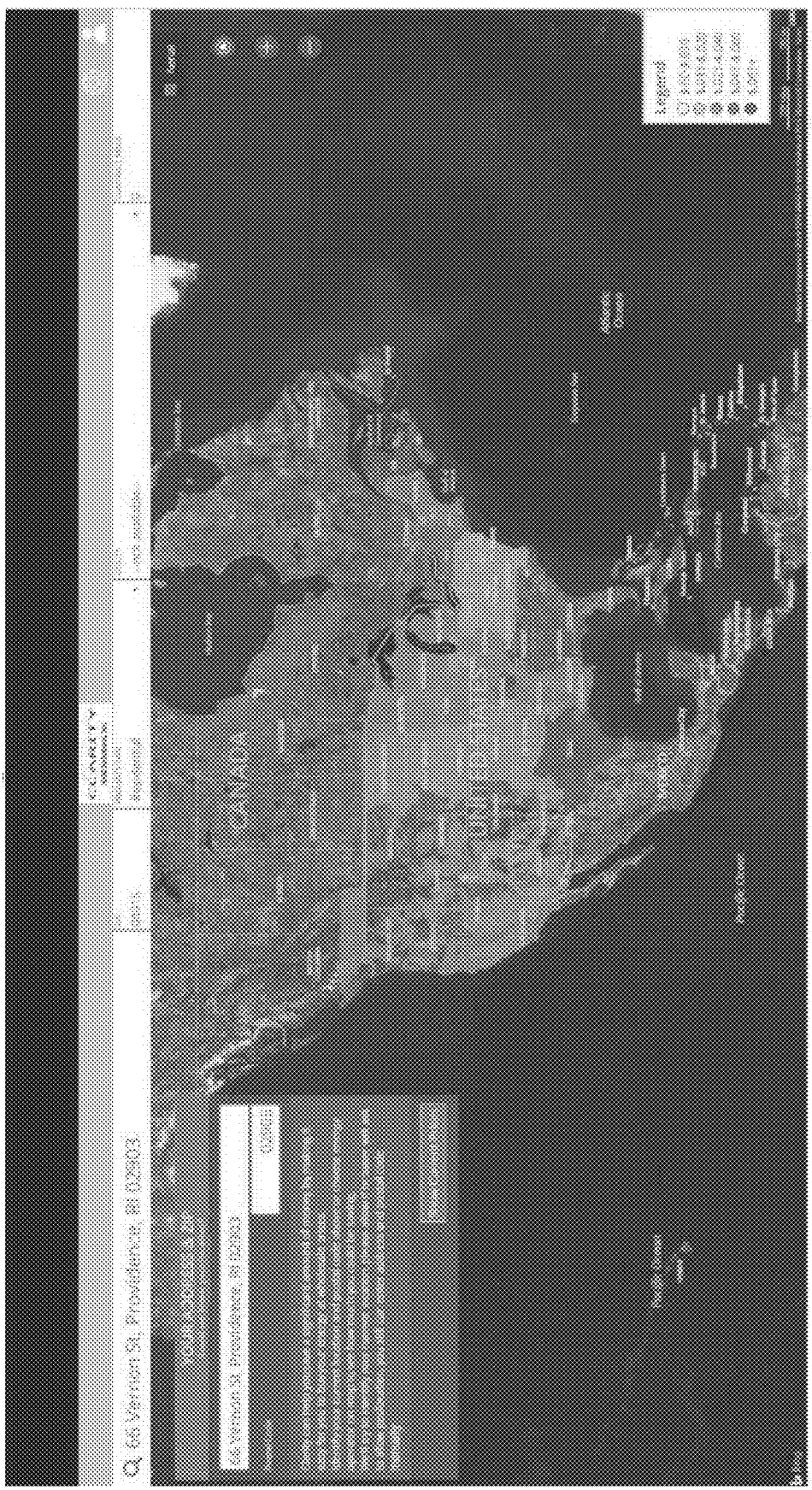
FIG. 12 is a screenshot of a login screen for example end-user consumer login portal, in accordance with an example embodiment.

Aspects of an example end-user consumer login portal will now be provided in connection with FIGS. 12-23. FIG. 12 is a screenshot of a login screen for example end-user consumer login portal, in accordance with an example embodiment. A user indicates either consumer or commercial user mode with the commercial mode providing more granular data to the sophisticated energy market. The seven ISOs operating in the United States are color-coded in the map. In consumer mode FIG. 12 is a screenshot of a search screen from which a user may provide a particular address or "zoom in" using map features, in accordance with an example embodiment. According to various embodiments, the system is configured to drive the screens that follow based on determining nodal/index data from additional sources (e.g., non-proprietary or proprietary). As discussed above, load and generation value information may be obtained at the node level in certain example embodiments. Some ISOs may make their information more readily available than others. In certain example embodiments, information may be obtained via an application programming interface (API) call to a public API provided by the ISO, information may be obtained by screen-scraping information published on a public website, etc. In general, it has been found that it is possible to obtain valuation information from the ISOs on an hourly basis. However, certain example embodiments may be able to obtain real-time data (e.g., if that data is made available).

FIGS. 13-16 are screenshots demonstrating how generation and load related information for an entered address can be displayed for a user, in accordance with an example embodiment. In certain example embodiments, when a user enters an address via FIG. 13, the user may be able to view generation and/or load related information for that address. In this example, the user enters "66 Vernon St, Providence RI 02903". This address is mapped to the New England ISO (NEISO).

Based on a data lookup from the ISO, utility, and/or the energy management system of certain example embodiments, it can be determined that the utility providing energy to this site is Narragansett Electric Co Similar to identifying the appropriate ISO price for the location, the system has identified the appropriate unique distribution utility by the customer's location which mirrors the patchwork quilt of coverage areas underlying the Grid. As discussed above, this approach provides for functionality unavailable in many conventional approaches.

Figure 15:
FIG. 15 is an example screenshot demonstrating how the closest generation point to an end user may be displayed, in accordance with an example embodiment.
Figure 16:
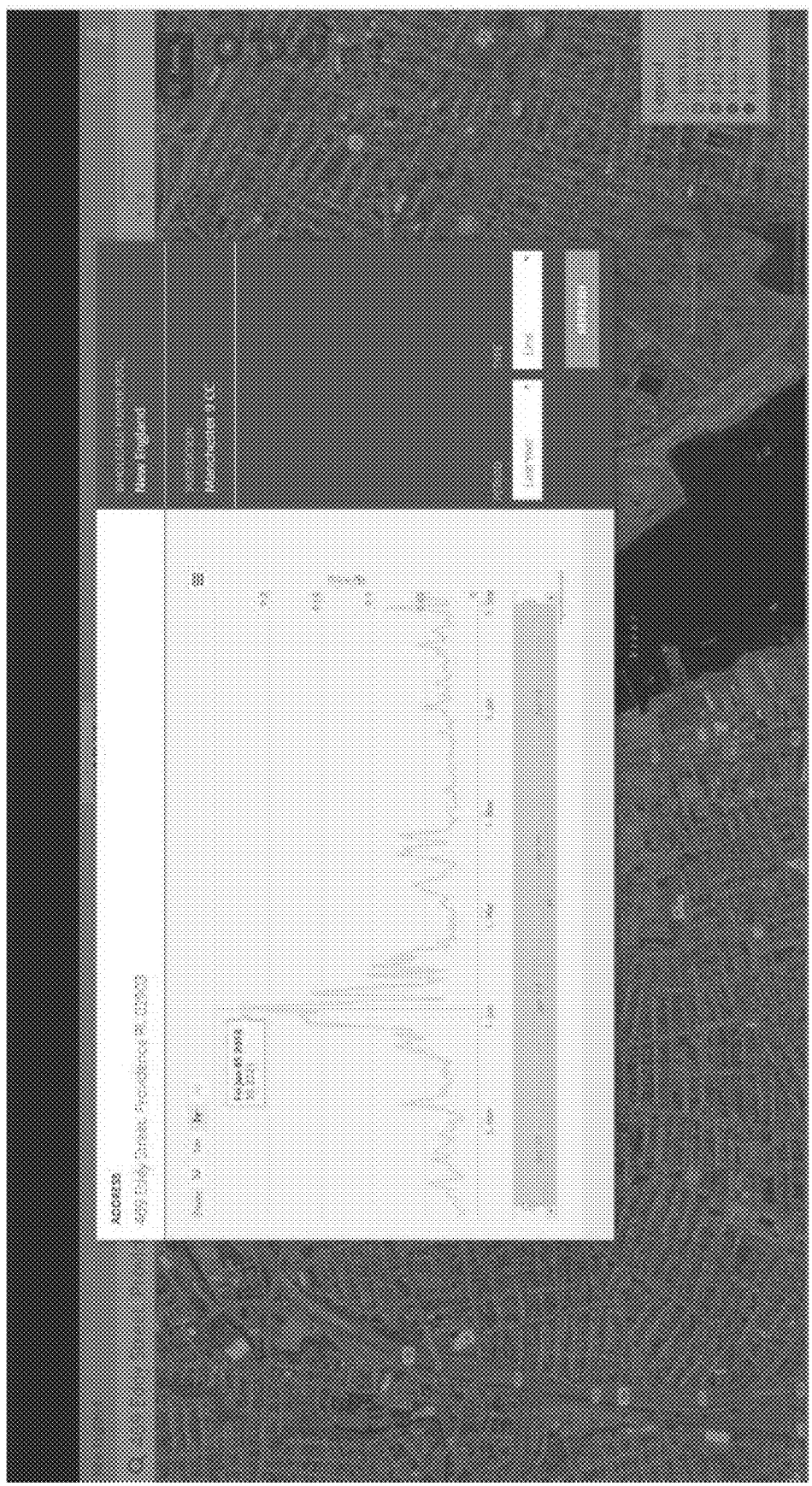
FIG. 16 is an example screenshot including a graph with a 12-month energy price for an example generation site may be displayed, in accordance with an example embodiment.

Furthermore, based on one or more lookups, it is determined energy generation is performed at the Manchester Combined Cycle plant as shown in FIG. 15, and energy load is provided through the Franklin Square Substation. The data retrieved and used to determine the generation and load sites is decoded using the rules, as described above. The rules have been generated by analyzing more than 500 million public records in order to map data as shown in FIG. 32. Shown in FIG. 32 is a column headed "Pricing Nodes for Load" which indicate specific geographic locations where the wholesale grid connects to the distribution system to serve load (substations) and the next column headed "Pricing Zones" indicates a geographic load-weighted average for these pricing nodes. In various embodiments, the pricing zones for MISO are referred to as "CP Nodes" which are "Commercial Pricing Nodes" and "AP Nodes" in FIG. 32 refer to "Aggregate Pricing Nodes."

Aggregating this data helps the energy management system "know" who is generating and providing energy, how they are generating providing energy (e.g., though what utilities, nodes, etc.), and what the associated costs (e.g., capacity and ancillary services) for generation and provision are. Power plant developers may leverage this information to understand combined cycle, peaking, wind/solar properties, etc., which may be useful to help them understand where nodes should be placed, etc. This information also includes transmission and distribution information, which can be useful for operators to understand how subsets of the grid are operating and whether alternative generation sources (e.g., solar panels) located locally may be advantageous to engage. By focusing on end user load, forecasting can be improved, which can lead to improvements in balancing over various conventional approaches.

Figure 13:
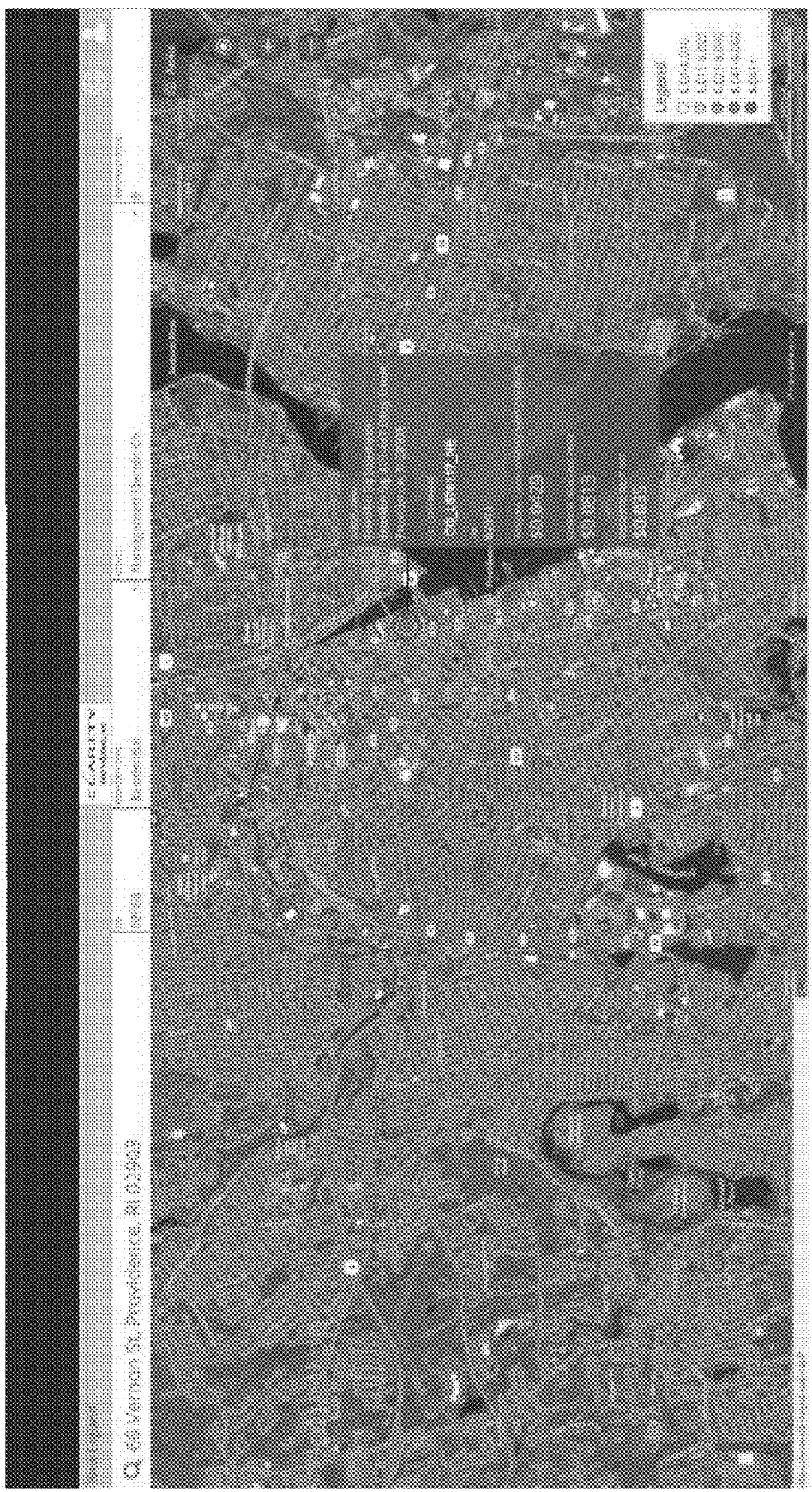
FIG. 13 is a screenshot of a search screen from which a user may provide a particular address or "zoom in" using map features, in accordance with an example embodiment.

Data aggregation of this type also may be useful to understand how valuations are generated and for improving the accuracy of decoding IDs and codenames. NEISO provides ID and codename values for generation and load sites. In this case, the ID and codename for the generation site are "321" and "UN.FRNKLNSQ13.810.CC" which have been mapped by the rules to the Manchester Combined Cycle plant as previously indicated as shown in FIG. 15, the ID and codename for the load site are "338" and"LD-.FRNKLNSQ12.5" which have been mapped by the rules to the Franklin Square Substation as previously indicated as shown in FIG. 13. Both ID values include the text "FRNKLN" which refers to "Franklin Square." The prefix "L" in the codename for Franklin Square substation denotes a "load" value while in Manchester CC "UN" code denotes "Unit" for generating unit. The "CC" part of the former codename can be decomposed and determined to denote "Combustion Turbines." Metrics for generation and load sites are provided on each of FIGS. 13 and 15.

Figure 14:
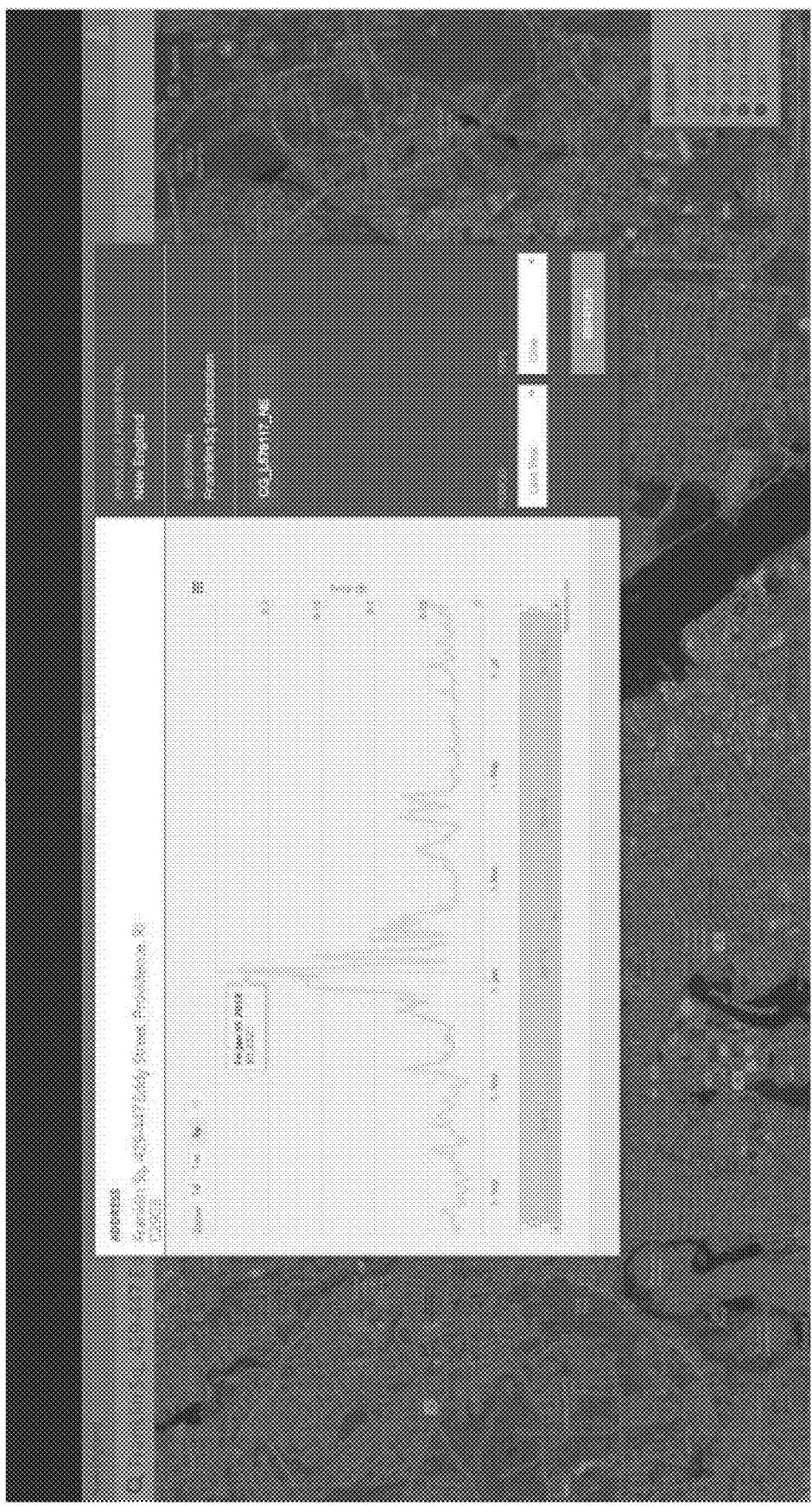
FIG. 14 is an example screenshot including a graph with a 12-month energy price for an example substation, in accordance with an example embodiment.

Historical information about the generation and/or load valuations can be retrieved and displayed for the user. FIG. 14, for example, is a screenshot including a graph with a 12-month load weighted energy price for the substation, which is at "Franklin Square"" as indicated in the metrics popup shown in FIG. 13, in accordance with an example embodiment. Different time periods, graph types, and/or the like, may be displayed upon corresponding user selection.

Figure 17:
FIG. 17 is an example screenshot of the initial address entry screen for an end user graphically displaying how they may be located on the Grid, in accordance with an example embodiment.
Figure 18:
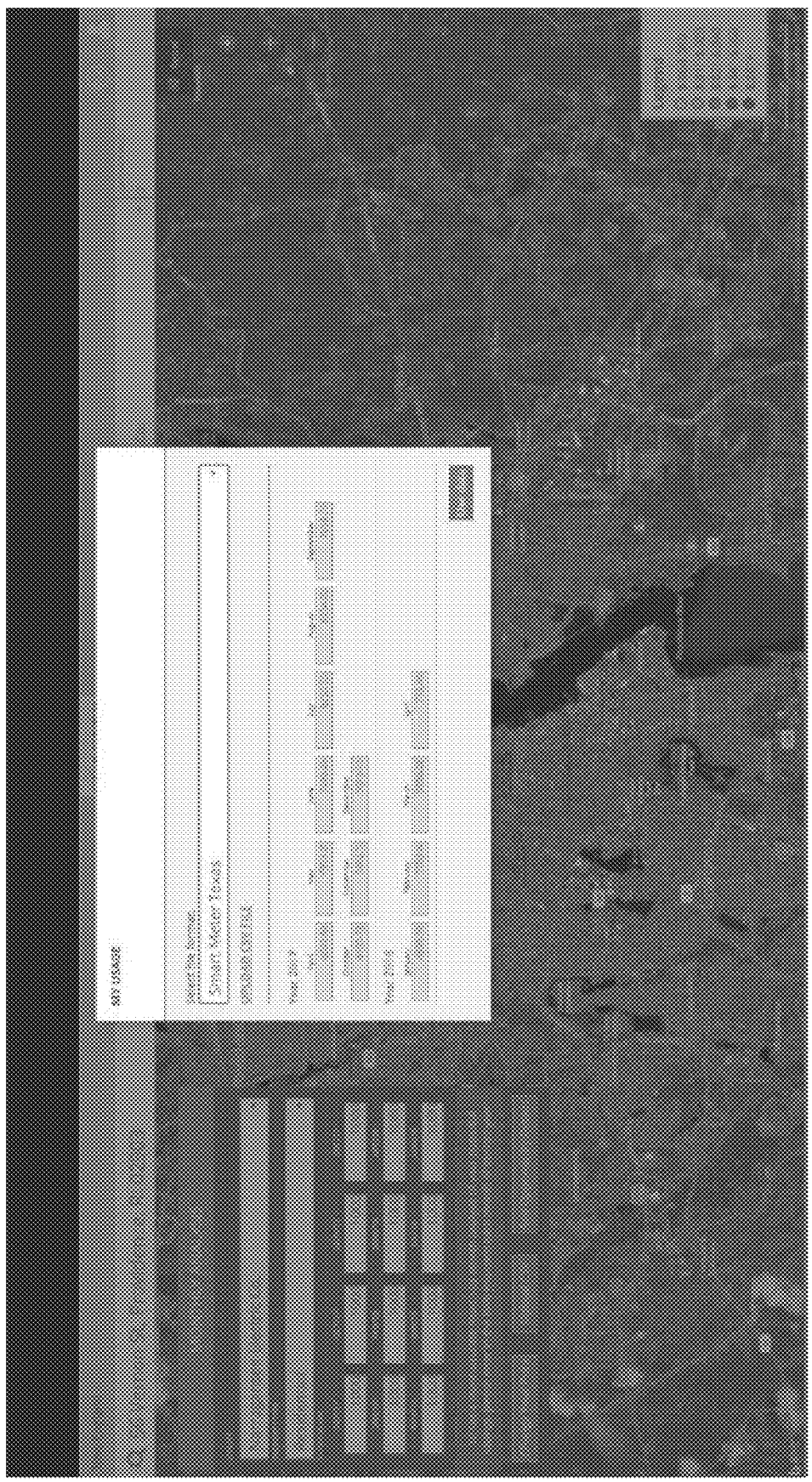
FIG. 18 is an example screenshot displaying how an end user's actual consumption may be imported, in accordance with an example embodiment.
Figure 20:
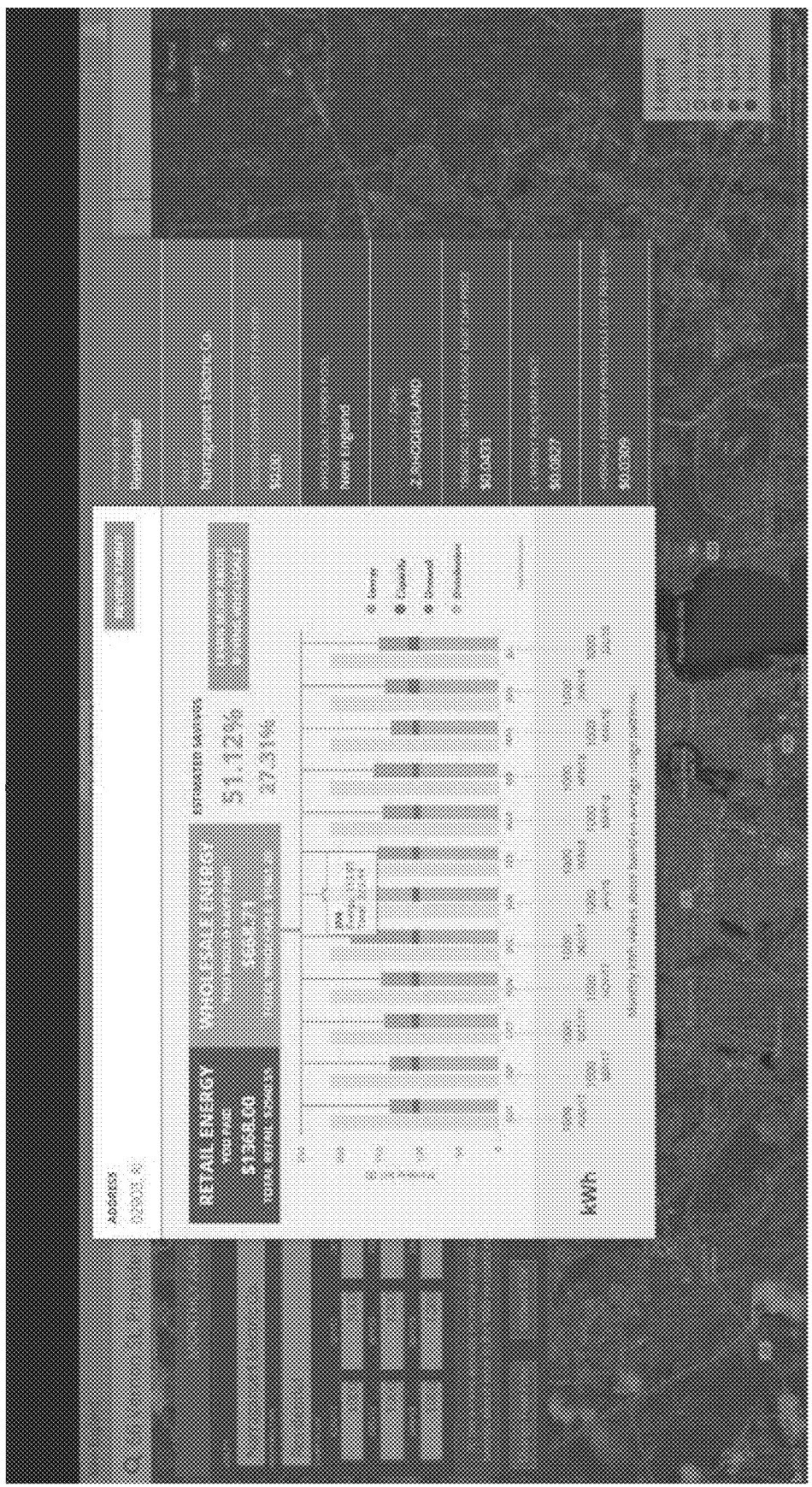
FIG. 20 is an example screenshot of calculated savings for wholesale vs retail tariff pricing.
Figure 21:
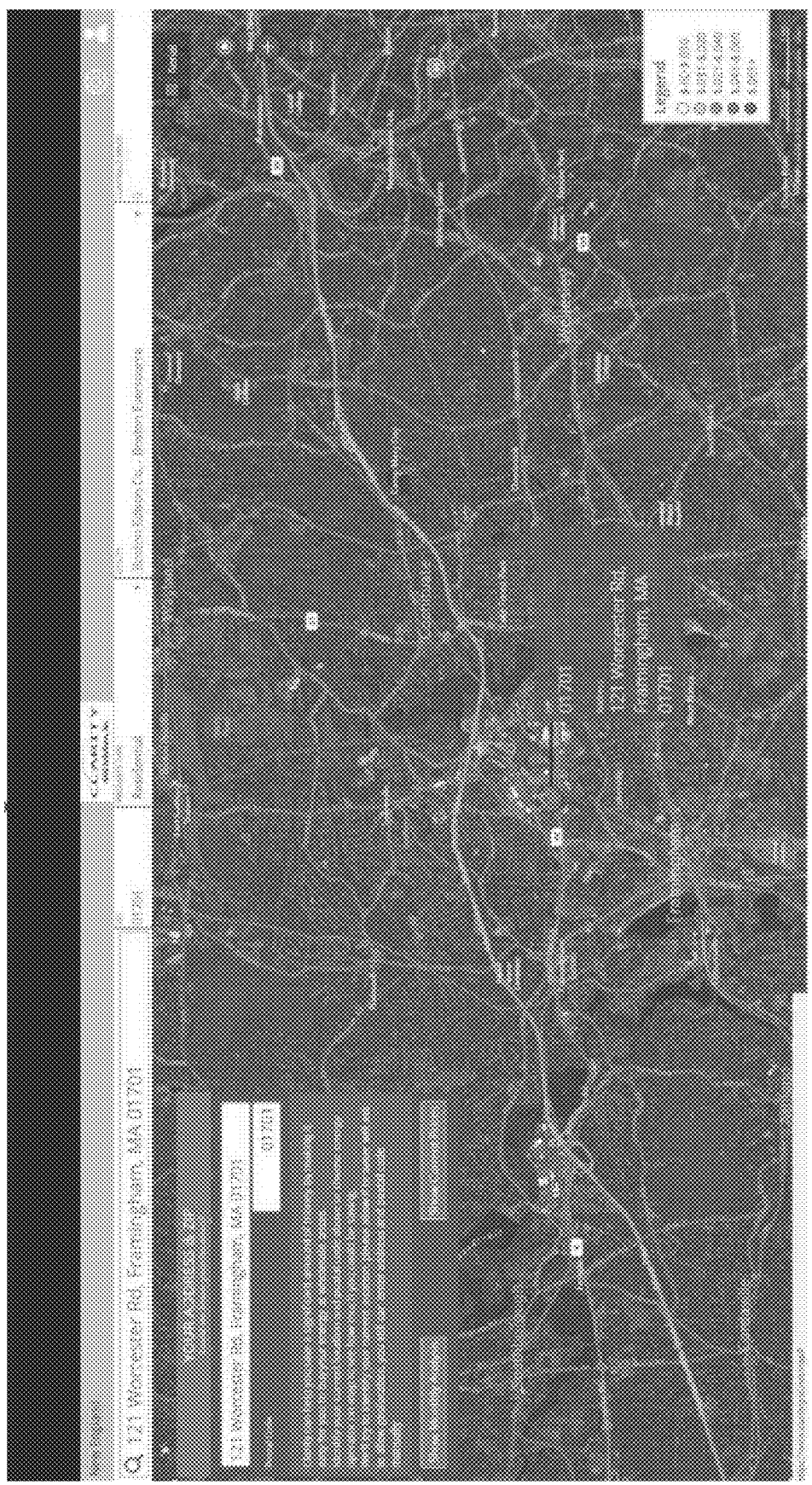
FIGS. 21-25 are example screenshots displaying end user economics under alternative tariff pricing structures.

FIG. 20 is a screenshot that shows, among other things, the wholesale value for the previous 12 months at a substation responsible for a residential customer at 66 Vernon St, Providence, RI 02903, in accordance with an example embodiment. In this case, the value is $0.0433/kwh. Data aggregation of the type described above enables optimization functions to be executed, and allows the system to display how wholesale energy prices can be converted to retail prices. Understanding how retail pricing is developed (e.g., taking into account various costs such as those associated with capacity, ancillary services, ISO administrative fees, etc.) advantageously enables the energy management system to provide better information to end users, e.g., so that they can alter their behaviors accordingly. Potentially more importantly, however, it allows the system to know how to respond in the presence of preferences that are linked to value. For instance, knowing this information can cause the system to process preferences such as, for example, "drop temperature X degrees in winter months if savings will be Y", "provide energy to grid if ISO is will pay Z", "run appliance P if value is negative regardless of time", etc. Various embodiments of the system enable user to enter conditional statements into the user interface, and have the system automatically resolve any associated restrictions associated with the user's energy provide, and automatically execution energy demand/consumption modeling based on the conditional preference information. Various conventional system cannot perform these functions. Shown in FIG. 17 is a screen capture of an example user interface showing how a residential consumer may be identified.

Figure 19:
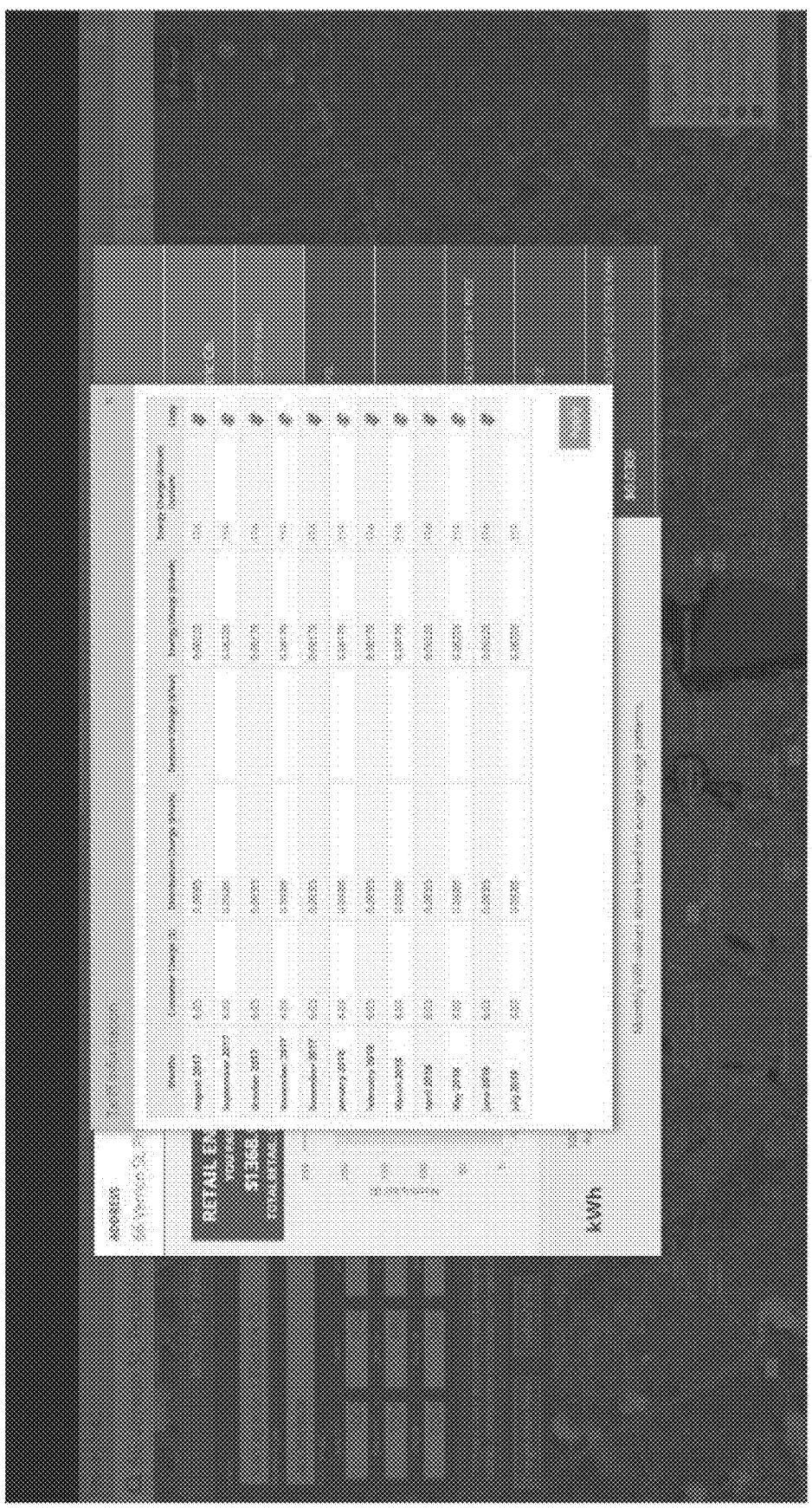
FIG. 19 is an example screenshot displaying the tariff components identified to the end user.

Having this aggregated information can also reveal information about regulation/deregulation. For instance, FIG. 19 is a screenshot of a user interface display. According to one embodiment, the user interface shows the major components of a consumer's electric tariff and the UI is configured to enable the end user to make selections within the display to modify the energy component of the tariff—which, for example, may be subject to market rates in deregulated states.

FIG. 20 is a screenshot providing visualization of data and analysis to provide the potential savings information a residential consumer may realize by accessing wholesale market prices, and optimizing energy consumption demonstrating that the delivery cost from the Franklin Square Substation is always regulated, regardless of the wholesale price regulation/deregulation tariff Including distribution and displays the provide access to translated information yielding visualizations of "all-in" cost of energy to various technologies (e.g., solar panels, batteries, distributed generation). Additional user interfaces visualize additional information for energy selection and/or management. For example, the system can display alternative tariff options that respective users may qualify and permit comparison of total costs across a plurality of options.

According to one embodiment, the interface identifies the end user by: first it's appropriate wholesale market price for a given period of consumption and second by pricing index. For example FIG. 13 shows a customer residing at 66 Vernon St, Providence RI 02903 as first matched to the nodal wholesale price at Franklin Sq NEISO node, which then corresponds to the Z.RhodeIsland Zonal price for power in NEISO. Prices are then displayed for the relevant time periods of Next Hour, Next Day weighted by the estimated (actual hourly consumption profile), and the Average of weighted Next Day prices for the previous 12 months.

Figure 22:
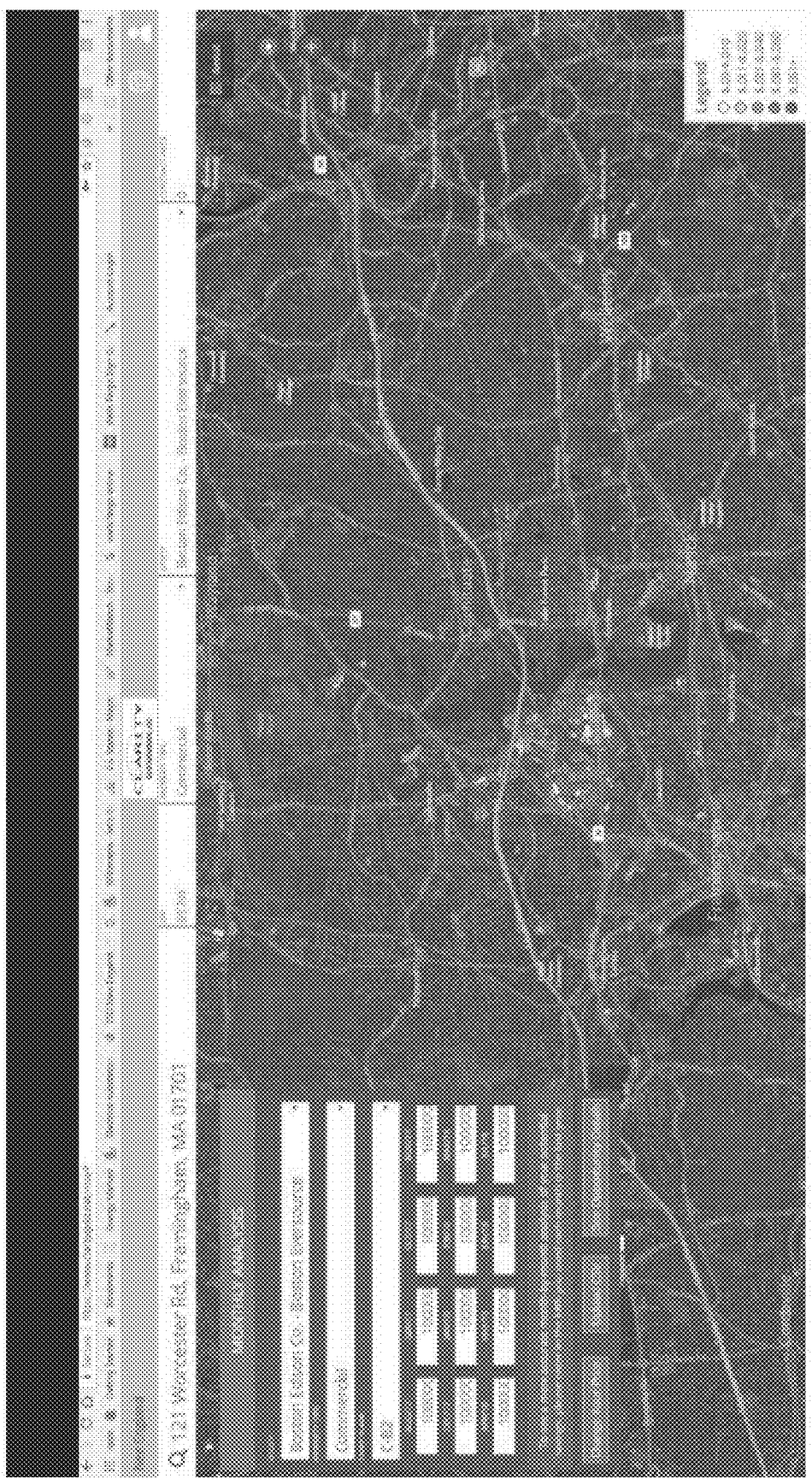

FIGS. 26-30 are screenshots showing how a user can compare annual energy costs using two different tariff structures (e.g., both of which may apply) to the specific customer. As shown in FIG. 22 for example, the user can select from a list of possible utility providers. This list is pre-populated in certain example embodiments based upon lookups of which utilities belong to the ISO and can provide energy to a specified address. The user also can run scenarios, providing different amounts of volume data. These scenarios may be forward-looking or rearward-looking. In the case of the former, upcoming prices may be taken into account and calculated based on current data. In the case of the latter, actual amounts spent can be compared to wholesale, retail, benchmark, and/or other prices. In the FIG. 22 example, the user can provide information in the boxes via keyed entry or the like. In certain example embodiments, this information may be pre-populated by the system, e.g., such that the most recent month's value is repeated through several months, the average of several past months' values are repeated, a trend is extrapolated, prior years' values are repeated, etc. In certain example embodiments, consumption values may be uploaded via a spreadsheet, CSV or other structured document, as previously shown in FIG. 18.

Figure 23:
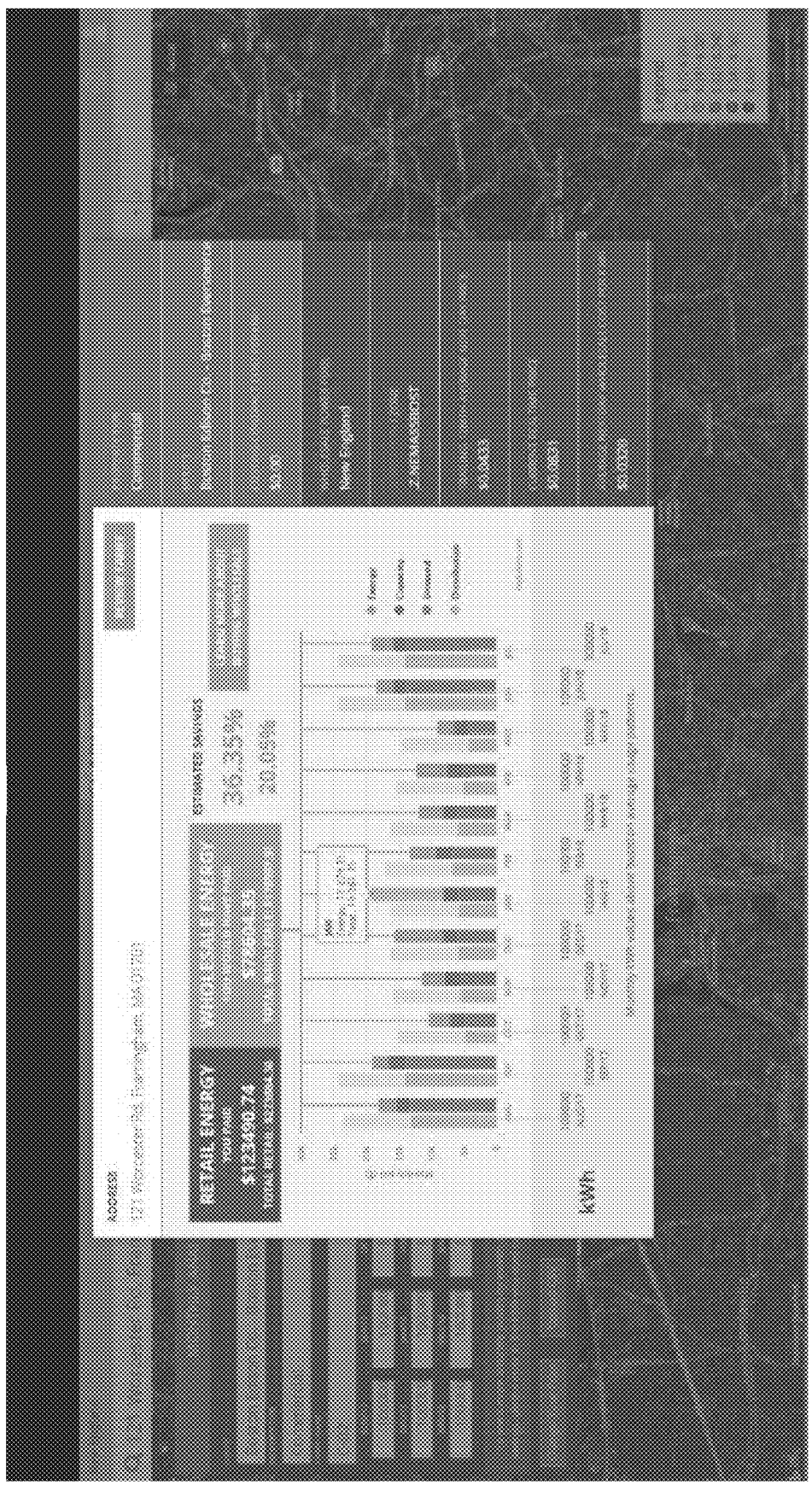
Figure 24:
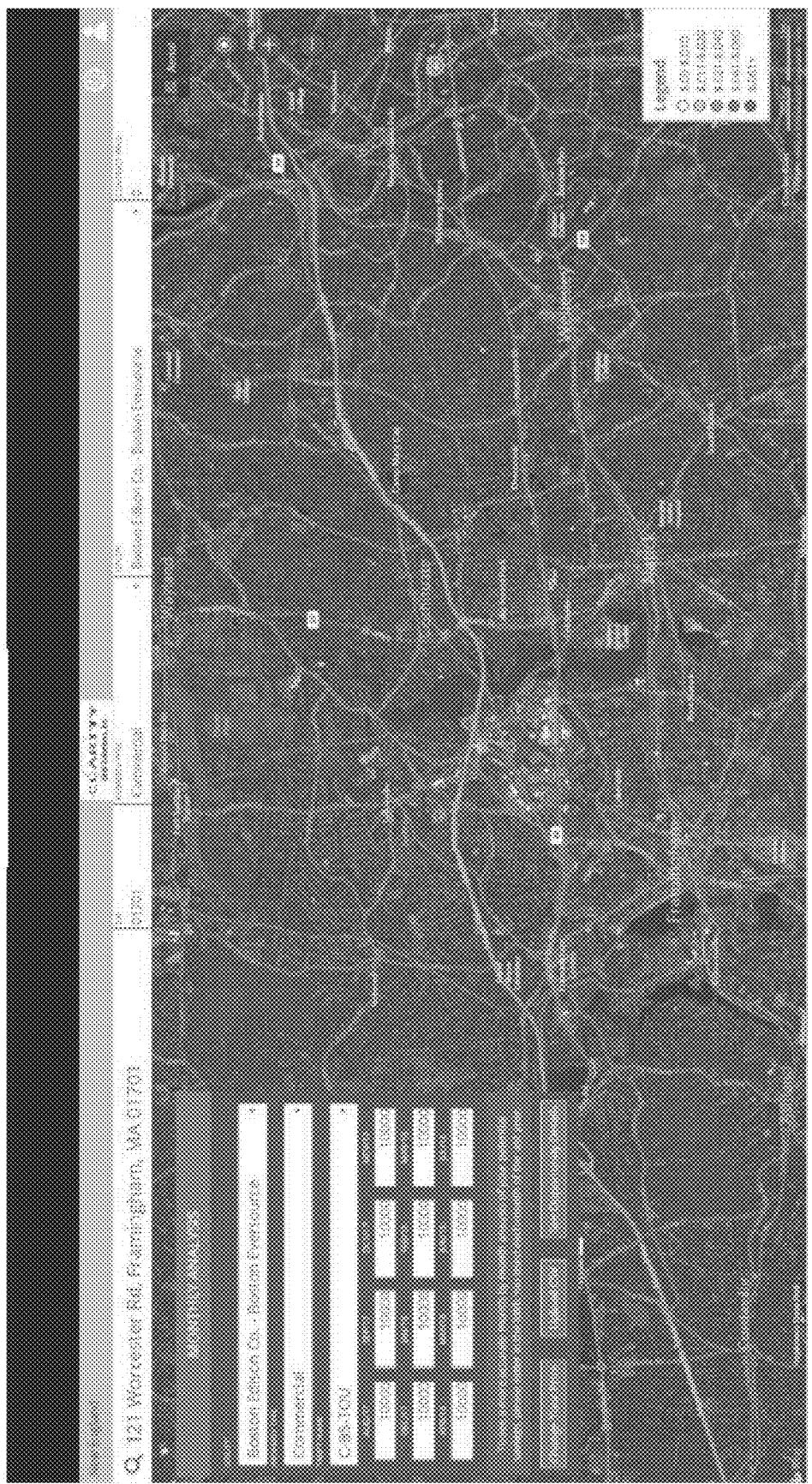
Figure 25:
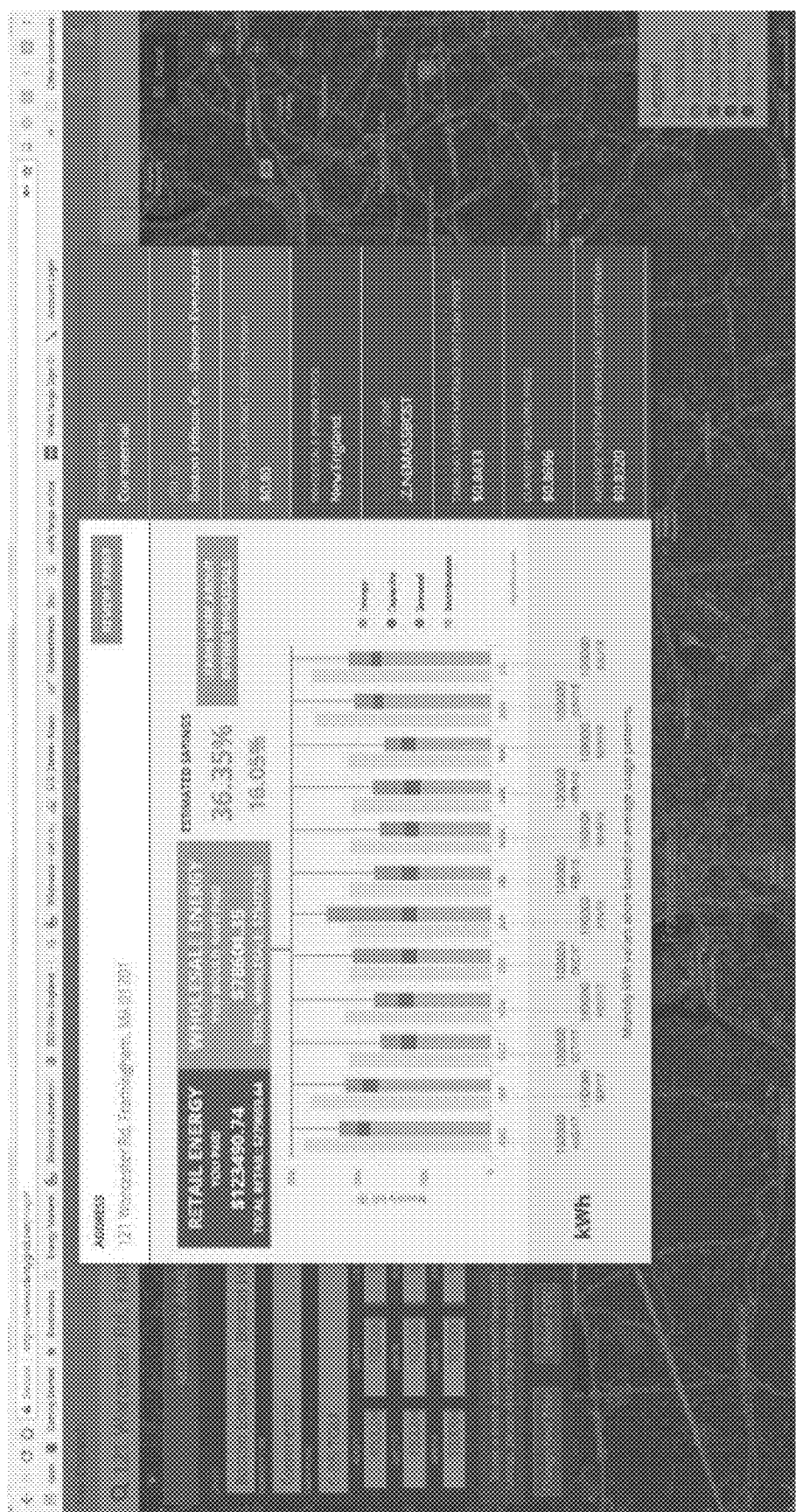

Based on the information provided, the FIG. 23 screenshot may be presented, demonstrating the price paid compared to wholesale and retail prices. An estimated savings value also is presented to the user. Details concerning how this information was obtained may be provided. For instance, information about the loads, retail and wholesale prices, utility involved, substation involved, etc., may be shown on-screen and/or via drill-down options. As shown in the FIG. 23 example, the customer would pay just under $0/04 for energy under wholesale pricing, as compared to the marketer cost of $0.09 or more, thereby enabling the user to save over 60% by obtaining energy directly from the distribution point. According to one embodiment, the system is configured to compute multiple distinct tariffs based on different generation and load distribution scenarios, and present visualizations of the same in the user interface. In one example, the system provides visualizations to isolate peaking type charges by looking at the data, etc.

FIGS. 26-31 are example screenshots demonstrating that aggregated data, including nodal data, can be visualized by the system to provide useful information in making power-related transactions interactive and subject to a smart grid, in accordance with certain example embodiments- and to provide visualization of the information the system analyses to execute various optimizations. For example, a user may be able to specify a willingness to provide energy back into the grid using the system, e.g., based on pricing information. Similarly, smart appliances in the home may auto-report usage to the system, provide information about preferences, etc., as indicated above. Based on this information, the system can aid in scheduling the generation and provisioning of energy more efficiently and more stably.

Dynamic schedule management becomes possible because information at the nodal level is available in certain example embodiments. As indicated above, in-home or commercial devices may connect through a smart hub that is in communication with the system. Such devices may include, for example, Smart Appliances, Smart Thermostats, Smart Circuit Breakers, Digital Twin/Footprint devices, building automation systems, etc. Assets and devices generally include sensors and sensing technologies that can be controlled via industry standard protocols that the smart hub can understand. By performing data analytics, pricing data and preferences can be transformed into actionable intelligence, enabling control of the devices in accordance with what would be expected by a human, etc.

Example Platform and Implementation

FIGS. 27-31 show example architectures via block diagrams of embodiments, of an energy device control system. In FIG. 27, an end user state associated with an energy demand is shown. The elements of the system capture information from ISOs, Distribution Utilities, and Public Agencies. This information is processed by an analytics engine (e.g., CG Analytics Engine). For example, translation operations can be executed to derive a common format between the information sources enabling comparison and optimizing across the different elements of the electric grid. In further embodiments, the analytic engine analyzes location-specific information (e.g., once data is translated into location specific information or location specific information is inferred by the analytic engine), analyzes delivery tariff information (e.g., based on locations), demand based tariff information, applies energy tariff analytics, DR/net metering models, analyzes estimated load models, and yields a holistic analysis or model of end user demand and potential optimization. The analytics engines can include one or more connections to end user sites and/or energy devices. For example, user preferences can be entered into end user devices and captured by the analytics engine for optimizing delivery including analysis of the models/analytics described above.

FIG. 28 is a block diagram of an example embodiment of an energy device control system. In FIG. 28, the system is executing optimization operations to determine a next day energy consumption/purchase model that incorporates customer preference and tariff data.

According to one embodiment, a distribution utility does not come into the transaction until a customer authorizes the system to become the supplier of record. Once this happens a customer authorization request is presented to the utility (e.g., energy supplier) and the utility may respond with important information such as meter number, historical usage etc., which is captured by the system and used to update historic models, predictive models. The communicated may first be translated into common format for such analysis, and in further examples, the communicate data can be used to automatically generate queries on the customers devices to complete any missing information, or in further embodiments, the data can be used to inferred missing values to generate more accurate models of energy use, needs, etc. In various examples, a registered energy provider (REP) communicates with the customer and utility to exchange this information, thus the system can be communicate with any of the preceding to capture data and set up a new supplier option. Various implementations supplant many of the roles of the REP, and the system can be configured to maintain communication with the REP as a legal intermediary pass through to ensure compliance with requirements by a particular State.

Figure 26:
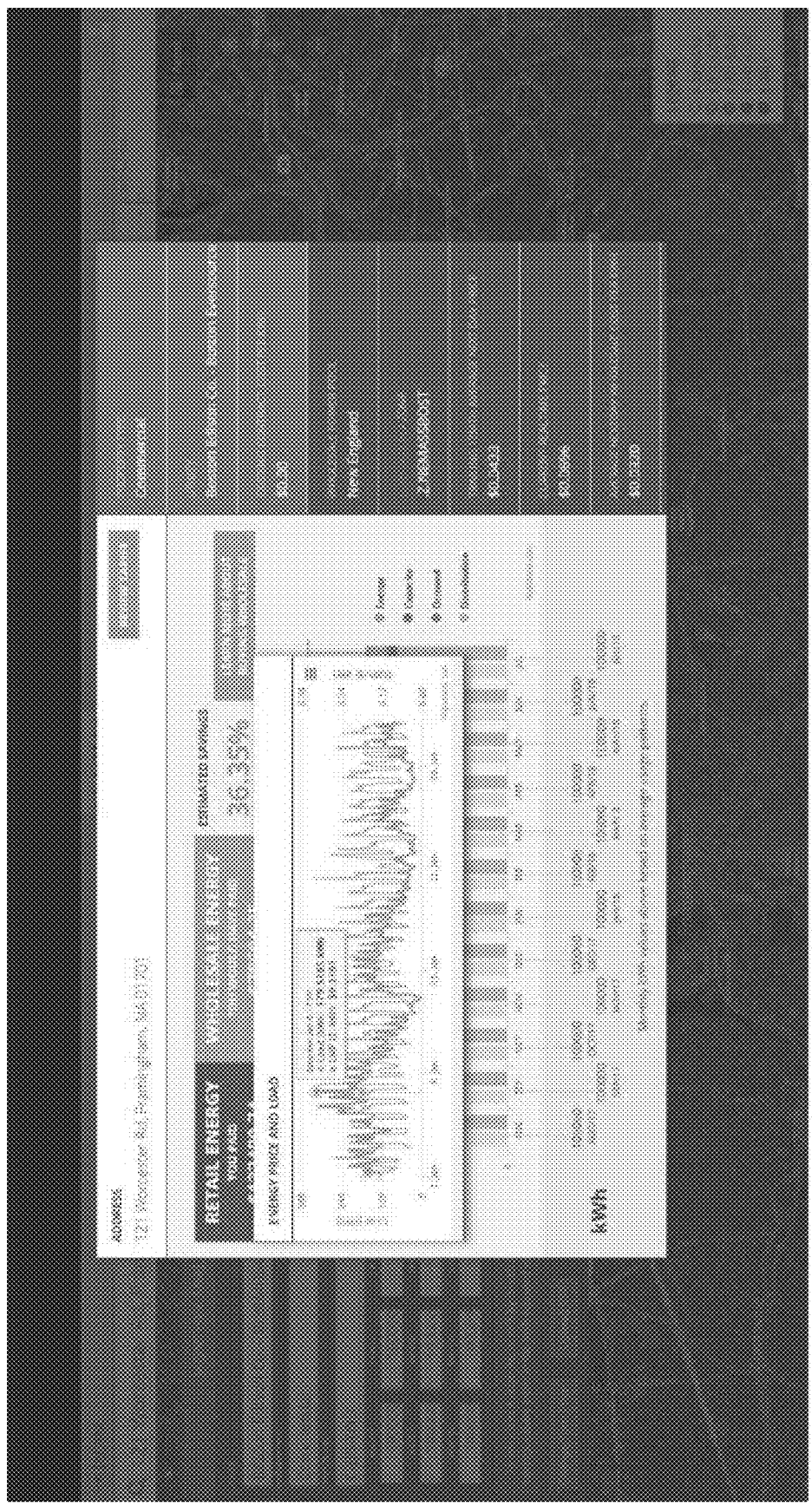
FIG. 26 is an example screenshot displaying hourly consumption and wholesale pricing for the end user for a particular month.

FIG. 29 is a block diagram of an example embodiment of an energy device control system 2600. In FIG. 26, the system is executing optimization operations to determine a next day energy consumption/purchase model that incorporates potential usage profiles across any number of end users and end user devices (e.g., hundreds and thousands or more end users). The potential usage models can be derived as discussed above, wherein the models can include translated information and/or inferenced information that associates energy usage categories to specific devices, providing boundaries on the variability of energy consumption, for example, available per user, location, and/or energy device.

Figure 30:
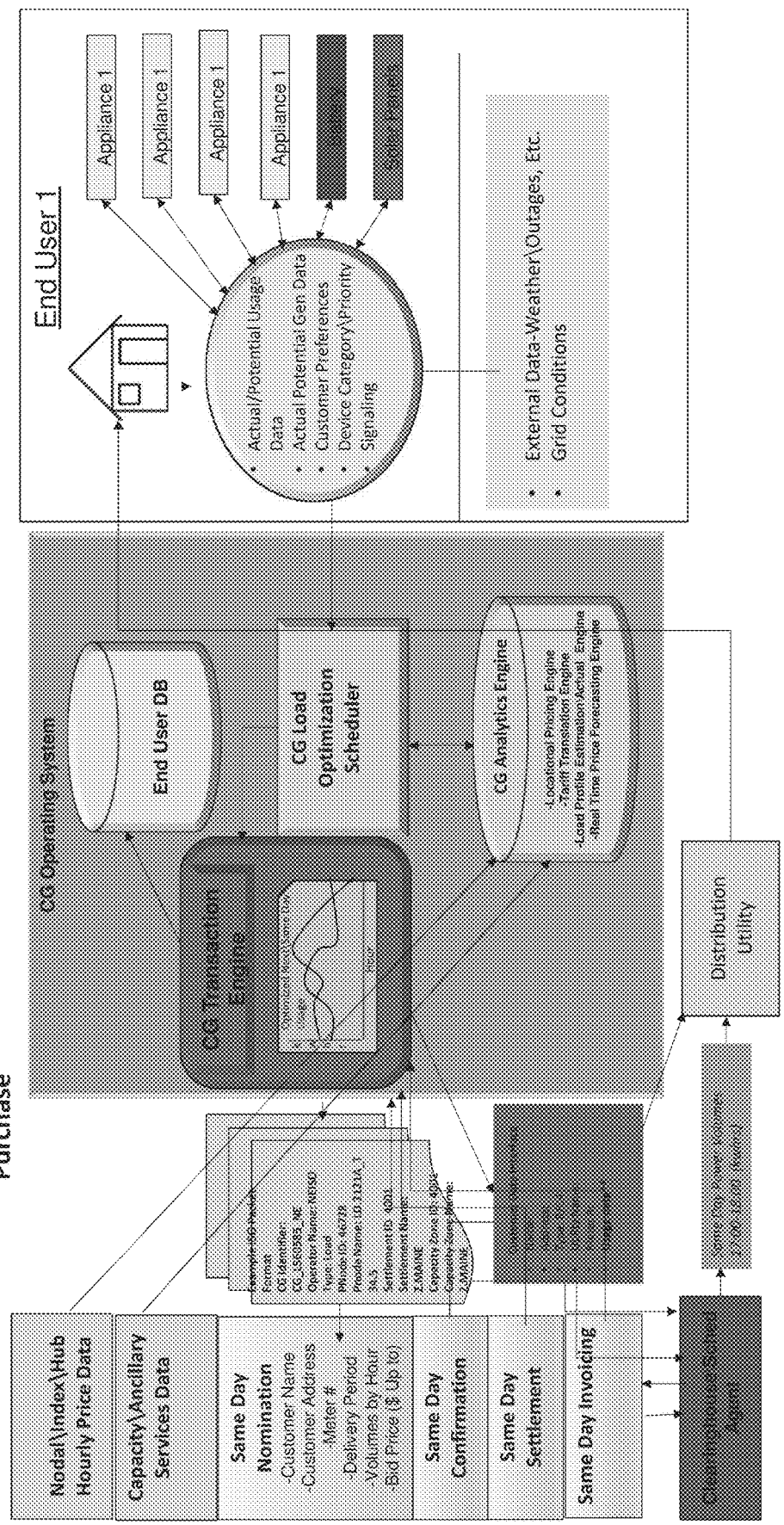
FIG. 30 is a block diagram showing example components of an energy device control system in accordance with an example embodiment.
Figure 31:
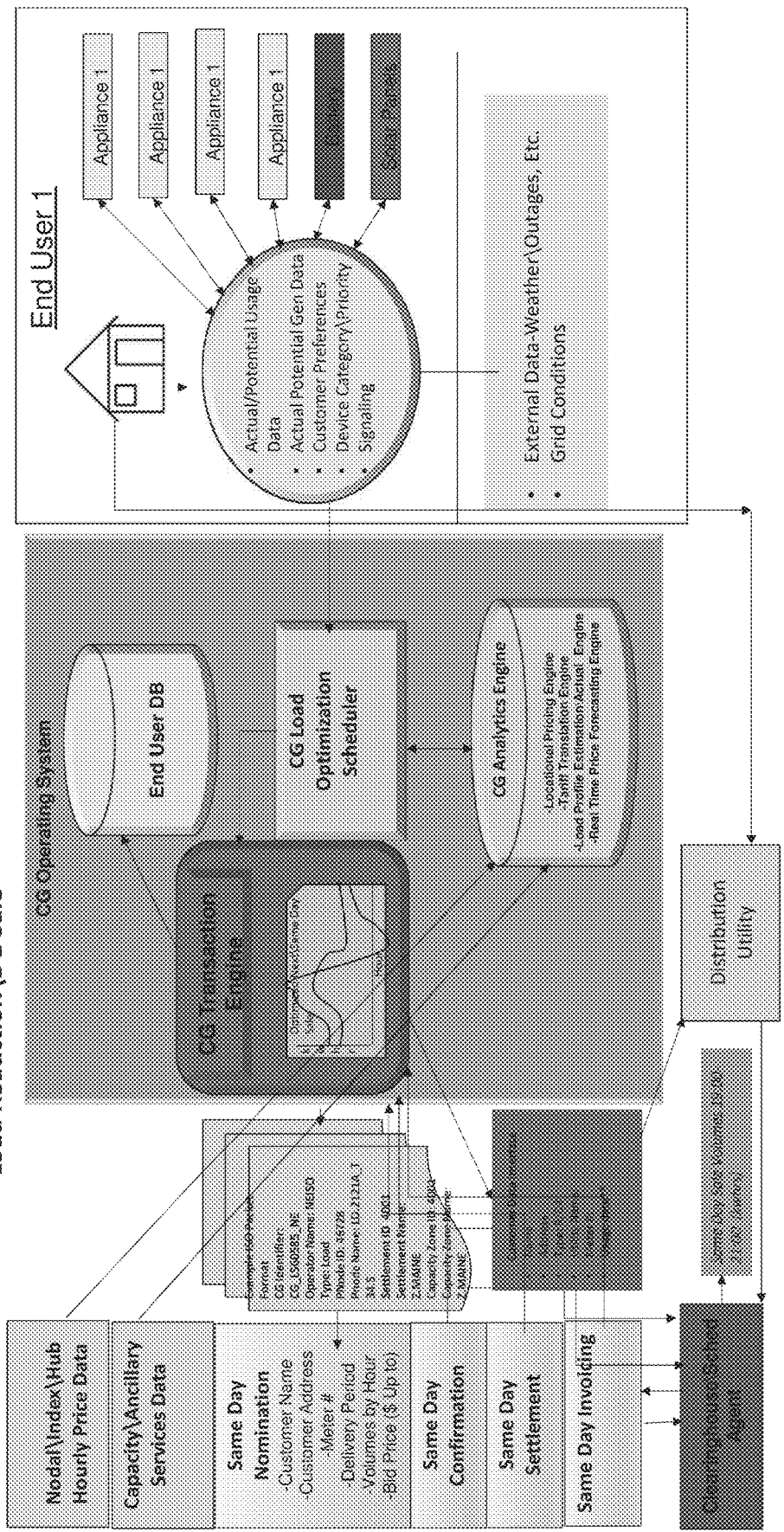
FIG. 31 is a block diagram showing example components of an energy device control system in accordance with an example embodiment.

FIG. 30, is a block diagram of an example embodiment of an energy device control system In FIG. 30, the system is executing optimization operations to determine same day hourly consumption/purchase. The system is configured to model next day requirements in advance and present nomination for energy load, and in addition the system continuously refines the prediction model based on actual usage during a day, provide the opportunity to further optimize energy consumption/purchase a next day energy consumption/purchase model that incorporates potential usage profiles across any number of end users and end user devices and tariff data.

According to various aspects, FIGS. 27-31 describe example end user states and demonstrate execution of system operation to: contact the consumer, provide data and analytics (including gathering historical usage data (if available) and consumer preferences regarding electric usage). In various examples, user can classify their devices based on load categories, and/or the system can determine candidate load categories based on analysis of energy use; show next day consumption/purchase modeling against an optimized load profile adjusted for an least one of (including any combination of) consumer preference, tariff availability, wholesale pricing data, and external factors' state 2a: potential load profiles generated from consumer preferences with various iterations determined and communicated for example to the ISOs as a tool for refining load forecasting in a bi-directional power flow world (see FIG. 29); state 3: same day purchase (e.g., hourly) based upon both realized and expected hourly prices from the ISO as well system based modeling (see. FIG. 30); and state 4: same day sale showing adjusted schedules, which can be based upon reduction in consumption or outright injection into the Grid from either Solar or Batteries, or various combinations of both options (see FIG. 31).

According to various embodiments, the system can generate and present user interfaces showing alternative pricing structures generated by the system based on optimization modeling discussed above. According to various embodiments, the user interfaces can provide commercial end user insight into location based tariffs (e.g., Milwaukee, WI or RI, among other options). In further embodiments, the system enables a given end user to evaluate alternative tariffs even in the context of a static load profile so as to optimize energy expenditures. Various conventional approaches simply fail to provide this functionality. Once the end user selects one of the displayed options, system uses the selected tariff to determine what load profile can be actualized given a set of preferences and potential optimizations? In some embodiments, the system generates optimization models for each of the tariff options—and generates displays of potential optimizations to further aid in the selection of the tariff model.

According to some embodiments, the system can execute many types of filtering on available energy delivery information. In one example, a first filter is executed on tariff information, providing "tariff filtering". According to one embodiment, during execution of functions for determining an optimal load profile (e.g., based upon preference and device categorization, among other options), the system is configured to determine that it was optimal to charge a device (e.g., electric vehicle) from 10:00 p.m. to 12:00 a.m. based upon historical hourly prices. The system then generates a schedule for energy request/delivery which is then nominated for execution. This optimization allows the system to account for scenarios where true hourly pricing is available. The system is further configured to handle scenarios where the optimal model is determined as above but the customer's utility does not have true hourly pricing available (e.g., via local utility tariff). In one example, the customer may only have available a time of use tariff ("TOU") which specifies provides for a lower energy delivery price from the hours of 00:00 to 08:00. The system applies the respective filters for the customer and their respective tariff options to determine that the optimized scheduled needs to be adjusted to conform and set a new schedule to the most optimal TOU timeframe.

According to another example, the system is configured to execute a second based on specific operations and or deliver constraints with a given ISO territory. For example, the system can execute an "ISO filter" defining pricing and operations within the respective ISO territory, and have ISO filters for each ISO, territory, etc. For example, a customer has both solar panels and batteries (e.g., distributed generation ("DG")). In this example, the system initially determines an optimal load profile that incorporates generation, and determines that the net usage by the customer should be negative (injection into the Grid) from 16:00-18:00.

However, according to various embodiments this initial determination are filtered through ISO restriction. For example, the system determines the effect of DG requirements that apply to further optimize load profiles. According to another example, once filtered through the ISO DG program requirements (or for example a Net Metering protocol where if appropriate) the system is configured to determine that energy generation (e.g., sales back) into the Grid by DG must be at a minimum scale of 2 kw and the load scheduled. In this scenario, the system modifies the optimal load profile to reduce injection into the battery to only what the customer is estimated to consume from 16:00 to 18:00 with 0 net injection into the Grid.

Stated broadly, various embodiments of the system determine potential cost savings to the customer by replacing fixed $/kwhr purchases under existing utility tariff with next day hourly prices $/kwhr as published by the ISO and specific to the customer's location. The system can be configured to perform this analysis on static load profiles, i.e., without preferences combined with market prices (and may also perform this analysis on load profiles with preference information). The result is compared to what actually can be realized (e.g. by applying filters on restrictions, operation requirements, etc.) in cost savings as a function of available tariffs or other restrictions specific to the customer, ISO, Utility, etc. In further embodiments, as the analysis by the system begins to incorporate demand response (DR), DG, or Net Metering the system defines an optimal solution, and then the available solution as constrained by the ISO's protocol which may reflected in the Utility's available tariffs for such activities. In other embodiments, the derivation of the optimal solution can proceed on all basis (e.g., the filtering can be made first so the optimized solution already accounts for limitations) simultaneously, in stages, or as a learning model that incorporates filters into the process in the first instance. Various embodiments, can combine the preceding operations into fewer steps, different order, etc.

According to some embodiments, in most utilities the scheduling of volumes is done on a daily basis by a clearing agent nominating a given hourly volume at a price "up to" a fixed $/kwhr (mwhr) for that hour, for a set of the 24 hours in the day. In one embodiment, the system maintains an extensive database of historic prices at each of the respective customer's location for each of these hours. When combined with the historic hourly usage by the customer and their preferences the system is able to generate a result which is the "optimal load profile" by hour and also a schedule which specifies energy bids "up to" the price which is expected to be realized for that hour. Via these operations the system can optimize both consumption and price. In the real time ("hourly") market ISO protocols (e.g., as filtered into the Utility tariff) may or may not allow for execution of purchases (sales) at an agreed upon price prior to the hour occurring, "ex ante bidding" and the system analyzes any of these restrictions when considering changes to the load profile purchased in the next day market. For example, the system is configured to determine if it is optimal to turn up the thermostat and reduce consumption at 15:00-16:00—because those volumes purchased at $0.05/kwhr can be "sold" at another time for $1.00/kwhr. In this example, the system is configured to modify the schedule to capture this optimization, so long as the option can be confirmed prior to any timing or other restriction (e.g., before 15:00). This analysis can performed for each device, each time period, etc.

The analysis can be presented on the system, for example, as potential price savings versus un-optimized costs. For example, the system can display historic prices for either next day or real time periods. However, because of the nomination protocols for most ISOs and the desire of the user to optimize usage against price during the operating day, a next hour indicative price estimation tool and display feature has been integrated into various embodiments. In execution, the system is configured to analyze historic hourly prices for this location and time period, as well as results from next day nominations (e.g., determination made by the system), and can also include analysis of current weather, economic activity etc., to create a system based market price, that enables further optimization on whether an end user should modify its consumption behavior for the hour to come.

According to various embodiments, the system is configured to link indicative hourly price to a respective code, wherein a data structure associated with the code identifies a specific location and ISO, that is retrieved by the optimization algorithms and enable the system to change schedule, consumption behavior, etc. based upon optimizing against the price signal.

The optimizations including, for example, contingent change in load (which can be expressed by the system as an indicative load profile at price $X) can be communicated to the utilities and grid operators (ISOs) so as to improve load balancing.

According to some embodiments, the system is configured to generate an optimized schedule and use the next day market to establish prices "Up To" a given price level for a regional energy transmission organization (e.g., PJM), but in another (e.g., ERCOT) no such price responsive mechanism is available. Accordingly embodiments of the system are configured to submit generation and load optimizations as a balanced amount based upon ISO forecasts cleared at generator offers and tailored so that the optimizations conform to each of the ISOs protocols. Similarly in another regional energy transmission organization (e.g., NYISO), the system can determined load and offer to reduce consumption at a price using the NYISO real time ex ante bidding procedure for price responsive load. According to some embodiments, the system operates under different constraints as no ex ante hourly price is available. In such settings, the system can be configured to rely upon "hourly forecasted" prices to initiate shifts (or changes) in consumption, among other options.

For example, an electric hot water heater is determined to be in the lowest priority category E with consumption of 4 kwhrs for 3 hours and historically has been turned on after early morning showers for the time period of 10:00-13:00. This energy was purchased in the next day market as part of the total hourly submitted next day schedule and cleared at an average price of $0.025/kwhr. Due to an outage on the Grid, prices realized in the hourly market were $0.20/kwhr for 9:00-10:00, but are forecast by the system to be $0.25 for 10:00-13:00. In execution, the pricing is delivered to the home network and read by appliance software, based on system optimizations an order is placed to defer turning on the appliance until 21:00-24:00 at a forecasted price of $0.025/kwhr. Thus the device defers consumption, and settles the long balance of 12 kwhrs (4×3 hours) for a credit of $2.70 (12×(0.25−0.025)), increasing the efficiencies associated with energy distribution.

According to further embodiments, the system balances load optimizations with DG capabilities. For example, DG consists of some form of generation (solar panels, wind generator, fuel cell) which typically is located and operates behind the customer meter and may be (or may not) be combined with a battery. DG can be used to offset consumption of power by the customer, or be re-injected into the Grid for credit. In some cases transactions of this type are defined as "Net Metering" and are governed by a Net Metering tariff. In some embodiments, the system is configured to capture the parameters of these facilities, i.e., generation/storage capacity, ramp up time, production profiles, etc. and assign them to a category much like all other load bearing devices. The system can then filter these parameters through both the utility tariff analysis as well as any requirements specified by respective ISOs (e.g., via the ISO's DG (Net Meter) Protocol). In one example, a regional energy operator (e.g., CAISO), the customer's address and type, e.g., large commercial, industrial, etc. would identify it to as a Socal Edison Large Commercial customer for Utility Tariff purposes.

The system identifies this location and resolves any requirements, tariffs, etc. in determining optimizations. For example, this location (e.g., address) and type would be matched against CAISO requirements to inject energy back into the grid. In the CAISO example, operation restrictions specifies that: Distributed energy resource aggregations (DERAs), meeting a 0.5 MW minimum capacity requirement, can participate in the CAISO day-ahead, real-time and ancillary services markets as a participating generator using participation models that fit the needs of the DERA.

Assuming there is a customer with facilities that include a large solar array with adjoining battery capacity that exceeds the 0.5 MW minimum—the system is configured to integrate and then optimize the generation and storage system to create an optimal load profile. The optimal load profile combines both purchased power from the Grid with both displaced power from the Grid from battery capacity, and also injects into the Grid surplus generation. According to one embodiment, the system in deriving these calculations analyzes: 1) Production profile of Solar Array, 2) Demand Charges avoided as expressed in the Utility Tariff, and/or 3) Revenue potential from injecting (selling) power back into the Grid in at market based prices as afforded by, for example, the CAISO DG protocol.

In one embodiment, some tariff structures call for a demand charge to be accessed only if short term peaks in consumption (5, 15, 60 minutes) exceed some threshold, e.g., 10 kw. In these cases the system can be configured to prevent any peak usage from exceeding this level through a withdrawal from battery capacity with any excess sold back into the Grid. The system is able to dynamically adjust to current use and modify such load to optimally employ stored energy. In this way both consumption and production of energy are optimized so as to relieve Grid stress through reaction to the appropriate operator signals, which some conventional approaches cannot achieve.

According to some aspects, unlike conventional approaches the system draws upon an exhaustive and unique dataset to match customers with the appropriate location constraints enabling optimizations on load/demand/price for power and with associated linkages to corresponding index/zonal prices. The system can provide this capability before any customer commitment for delivery. Similarly, the systems optimizes for industry applications (e.g., smart grid software developers) and the optimizations are standardized across all locations so that automated referencing to the appropriate prices embedded in software code is simplified, thereby improving execution of the grid and associated systems. In various embodiments, the system can include an analytics engine configured to match end user to wholesale price and tariff, capture historic consumption information, translate consumption (generation) into device level usage, assign priorities based upon customer preferences, create optimal load and achievable load profiles, factor in historic wholesale hourly pricing, external factors, e.g., weather, grid stress, etc. and then submit a next day load allocation request. Wherein the system process this order through all the required states; nomination, confirmation, metering, settlement, invoicing, accounting for location specific constraints.

Various embodiments can include a plurality of elements that can be used separately, in conjunction, and in any combination.

According to one aspect, an energy device control system executing on a distributed grid subsystem operative to control a first power demand of a plurality of appliances (e.g., energy devices (e.g., generators, energy consumers, etc.)), is provided. The system comprises a graphical user interface configured to accept a user input indicative of a first demand and dynamic allocation flexibility associated with the a respective energy device, a communication interface configured to aggregate dynamic allocation values from a plurality of system nodes including at least the user input indicative of a first demand and the dynamic allocation flexibility. and at least one processor programmed to generate a learning model for evaluating dynamic future allocation with future energy execution prediction, wherein the dynamic future allocation includes at least energy operational information based on a categorization of energy usage at a plurality of respective energy devices, and trigger energy generation on the energy grid at respective generator nodes according to the learning model and dynamic projections.

According to one embodiment, at least one processor is further configured to assign categories of energy execution for a respective device as part of generating the learning model for dynamic allocation flexibility. According to one embodiment, at least one processor is further configured to assign a category of an energy requirement for a respective device as part of generating the learning model for dynamic allocation flexibility. According to one embodiment, the category is selected from a plurality of categories including at least a first category for non-deferrable energy consumption, a second category for a deferrable energy consumption having a time limited window for deferment, and a third category having a longer time window for deferment relative to the second category.

According to one aspect, a method for energy device control executing on a distributed grid subsystem, the method operative to control a first power demand of a plurality of appliances (e.g., energy devices (e.g., generators, energy consumers, etc.)) is provided. The method comprises accepting in a graphical user interface a user input indicative of a first demand and dynamic allocation flexibility associated with a respective energy device, aggregating, by at least one processor, dynamic allocation values from a plurality of system nodes including at least the user input indicative of a first demand and the dynamic allocation flexibility, and generating, by at least one processor, a learning model for evaluating dynamic future allocation with future energy execution prediction, wherein the dynamic future allocation includes at least energy operational information based on a categorization of energy usage at a plurality of respective energy devices, and triggering, by at least one processor, energy generation on the energy grid at respective generator nodes according to the learning model and dynamic projections.

According to one embodiment, the method further comprising an act of assigning categories of energy execution for a respective device as part of generating the learning model for dynamic allocation flexibility. According to one embodiment, the method further comprises an act of querying respective devices to capture additional information. According to one embodiment, the method further comprising an act of assigning categories of energy requirement for a respective device as part of generating the learning model for dynamic allocation flexibility. According to one embodiment, the method further comprising an act of selecting, by at least one processor, the category from a plurality of categories including at least a first category for non-deferrable energy consumption, a second category for a deferrable energy consumption. According to one embodiment, the method further comprising an act of assigning categories of energy requirement for a respective device as part of generating the learning model for dynamic allocation flexibility. According to one embodiment, the method further comprising an act of selecting, by at least one processor, the category from a plurality of categories including at least a first category for non-deferrable energy consumption, a second category for a deferrable energy consumption having a time limited window for deferment, and a third category having a longer time window for deferment relative to the second category.

According to one aspect, a method for optimizing energy allocation on an energy grid, the energy grid including distributed grid controller, distribution nodes, and energy devices is provided. The method comprises retrieving, via an electronic interface, operation information associated with devices attached to the energy grid (e.g., energy consuming, energy generating, and/or hybrid devices), the operation information including data relating to usage, a location, and a value (e.g., fabrication value of electricity) for the associated devices, receiving, from a plurality of energy devices, requests for energy fabrication and requirements associated with those requests for energy loads input into a user interface connected to the energy device, generating a learning model for energy fabrication requirements for the energy grid, wherein the act of generating the learning model includes evaluating future requirements, wherein the future requirements detail at least energy consumption preference based on a category of energy usage (at least a first and second category of use (e.g., primary category—deliver required energy regardless of a fabrication value, secondary category—some flexibility in energy use wherein the flexibility is constrained by time threshold (e.g., less than 24 hours), third category—greater than spot pricing flexibility in energy use, and forth category—complete discretion as when to schedule energy use)), and adaptive modification rule or rules (e.g., modifying consumption based on fabrication value), wherein the adaptive modification rule or rules is based on specified energy fabrication expected to occur at a future time and a limitation on energy consumption responsive to the specified energy fabrication to occur at a future time or an increase on energy requirement responsive to the specified energy fabrication to occur at a future time, scheduling, provision of energy from the energy grid to the plurality of energy devices, and communicating the fabrication information to the distribution nodes via one or more of the distributed grid controllers based on the learning model of energy consumption, and triggering delivery of energy in accordance with the scheduled provision of energy.

According to one embodiment, the method further comprising acts of dynamically modeling energy execution as factors affecting energy generation change over time or become known (e.g., adapt model to current temperature, adapt model to include current energy usage, adapt model of future energy consumption prediction to include updated future user preference, etc.), and adjusting the learning model for energy fabrication requirements periodically, a-periodically, or by a schedule (on new consumption data, environmental factor data, updated environmental factor data, etc.). According to one embodiment, the method further comprising acts of dynamically adjusting the scheduled provision of energy responsive to the act of adjusting the future consumption model and communicating the schedule information to the one or more of the distributed grid controllers. According to one embodiment, at least some of the operation information is defined by a native format that varies based on its source, and the method further comprises an act of translating the retrieved operation information from a native format into standardized location data and standardized value data including additional information relative to at least some corresponding retrieved natively formatted operation information. According to one embodiment, the act of translating includes an act of identifying and applying respective one of a plurality of predefined execution rules that are identified and applied based on the source and content of the operation information. According to one embodiment, the method further comprises determining that a native format or operation information communicated from an energy device lacks sufficient information to complete the standard format. According to one embodiment, the method further comprises an act of triggering a query (e.g., to the end user device and/or location) to capture additional information and complete the standard format for the respective communication, responsive to determining the operation information lacks information.

According to one embodiment, the method further comprises an act of triggering a query to capture additional information and complete the standard format for the respective communication, responsive to determining the operation information lacks information. According to one embodiment, the method further comprises an act of querying respective devices to capture additional information. According to one embodiment, the method further comprises generating inferred values based at least in part from historic user data to determine the insufficient information. According to one embodiment, the method further comprises generating inferred values based at least in part on from the act of modeling energy consumption/usage for the energy grid to determine the insufficient information. According to one embodiment, the method further comprises executing a machine learning model on similar users or similar energy devices having similar usage patterns and/or similar future use preference (e.g., wherein the future use preference describes energy usage preference based on a category of energy usage and a user defined energy use modification rule or rules) and generating with the machine learning model values to complete the information to complete the standard format. According to one embodiment, executing the machine learning model includes an act of generating with the model a categorization of energy usage. According to one embodiment, the modification rule or rules is based at least in part on specified fabrication value expected to occur at a future time and a limitation or increase on energy usage responsive to the specified fabrication value to occur at a future time. According to one embodiment, the method further comprises acts of receiving, from a plurality of energy devices, categorization of energy requirements to generate energy and execution options associated with respective requirements for generation of energy at a future time, and updating learning model for energy fabrication requirements for the energy grid and the schedule of provisioning responsive to the act of receiving offers to generate.

According to one aspect, a method of improving load forecasting accuracy and/or energy-related load optimization in connection with an energy grid, the energy grid comprising centralized grid management systems and distribution nodes is provided. The method comprises retrieving, via an electronic interface, operation information associated with components of the energy grid, the operation information including data relating to a location and a value (e.g., energy usage/delivery cost) for the associated components, the operation information having a native format that varies based on its source, programmatically applying predefined rules from a predefined rule set to the retrieved operation information to translate the retrieved operation information from its native format into standardized location data and standardized value data that is more granular in detail compared to at least some corresponding retrieved natively formatted operation information, wherein the predefined rules that are applied are selected based at least in part on the source and content of the operation information, receiving, from a plurality of end user energy consumers, requests for energy loads and preferences associated with those requests for energy loads, scheduling, based on the received requests, preferences associated with the received requests, and the standardized location data and standardized value data, provision of energy from the energy grid to the end user energy consumers, via one or more of the centralized grid management systems, and triggering delivery of energy in accordance with the scheduled provisioning, regardless of the transactional protocol(s) implemented by the one or more of the centralized grid management systems associated with the scheduled provisioning.

According to one embodiment, at least some of the centralized grid management systems are responsible for managing energy production, load, and transmission for a respective defined portion of the energy grid. According to one embodiment, the centralized grid management systems include independent system operators. According to one embodiment, the distribution nodes include substations. According to one embodiment, operation information in a first native format includes location and/or value related data at a nodal level and operation information in a second native format includes location and/or value related data at level more coarse than the nodal level. According to one embodiment, the second native format includes location and/or value related data aggregated for a plurality of nodes. According to one embodiment, the method further comprising receiving from respective devices actual and/or potential energy usage data. According to one embodiment, the actual and/or potential energy usage data is provided on a load-bearing device by load-bearing device basis. According to one embodiment, load-bearing devices include appliances. According to one embodiment, the preferences pertain to individual load-bearing devices. According to one embodiment, the preferences specify one or more of: (a) whether a an operational parameter of a corresponding load-bearing device is adjustable, (b) a range in which an operational parameter of a corresponding load-bearing device is adjustable, (c) a time at and/or time range in which a corresponding load-bearing device can be activated and/or deactivated, (d) a time at and/or time range in which an operational parameter of a corresponding load-bearing device is adjustable, and (e) an exchange condition. According to one embodiment, requests are requests for a subsequent day, and the act of scheduling is executed for a twenty four hour period. According to one embodiment, requests are same-day requests and the acts of scheduling provision of energy from the energy grid to the end user energy consumers, via one or more of the centralized grid management systems and triggering delivery according to schedule are re-executed to incorporate the same-day request.

According to one embodiment, the scheduling is performed by executing a scheduling algorithm, the scheduling algorithm being defined for a given one or more of the centralized grid management systems and taking into account operational parameters specific to the given one or more of the centralized grid management systems. According to one embodiment, the delivery of energy is triggered by transmitting a message to the one or more of the centralized grid management systems associated with the scheduled provisioning, the message being in a format specific for the one or more of the centralized grid management systems associated with the scheduled provisioning different from at least the first native format. According to one embodiment, the method further comprising an act of receiving, from a plurality of end user energy consumers, offers to generate energy and user preferences associated with those offers for generation of energy at a future time. According to one embodiment, the method further comprising an act of updating the acts of scheduling and triggering responsive to analyzing the offers to generate energy. According to one embodiment, the method further comprising an act of translating triggering instructions to respective ones of a plurality of the centralized grid management systems associated with the scheduled provisioning according to at least first execution protocol and at least a second execution protocol. According to one embodiment, the method further comprising and act of generating an automated schedule for the provision of energy, wherein the act of generating the automated schedule includes an act of maintaining respective portions of the model that are standardized for respective ones of the centralized grid management systems in accordance with at least a first and a second executional protocols specific to respective ones of the centralized grid management systems.

According to one aspect, an energy device control system executing on a distributed grid subsystem operative to respond or control power demand for a plurality of appliances (e.g., energy devices (e.g., generators, consumers, etc.)), the energy device control is provided. The system comprises an interface component configured to capture information associated with a first demand or a dynamic allocation flexibility associated with the a respective energy device, a communication interface configured to aggregate dynamic allocation values from a plurality of system nodes including at least the information indicative of a first demand and the dynamic allocation flexibility, and at least one processor programmed to identify un-profiled energy devices and apply a classification learning model for classifying un-profiled energy devices into a category of energy usage (at least a first and second category of use (e.g., primary category—deliver required energy regardless of a fabrication value, secondary category—some flexibility in energy use wherein the flexibility is constrained by time threshold (e.g., less than 24 hours), third category—greater than spot pricing flexibility in energy use, and forth category—complete discretion as when to schedule energy use)), execute a machine learning model for evaluating dynamic future allocation with future energy execution prediction, wherein the dynamic future allocation includes at least energy operational information based on a categorization of energy usage at a plurality of respective energy devices, and trigger energy fabrication on the energy grid at respective generator nodes according to the learning model and dynamic projections.

According to one embodiment, the method further comprises applying the classification model to identify similar users or similar energy devices having similar usage patterns and/or similar future use preference and categorize a device under analysis based on a profile of similar users or similar energy devices. According to one embodiment, at least one processor is configured to update the machine learning model for evaluating dynamic future allocation with future energy execution prediction based at least in part on automatically classified energy devices. According to one embodiment, at least one processor is configured to trigger energy fabrication on the energy grid at respective generator nodes according to the updated learning model. According to one embodiment, the method further comprising an act of confirming with an end user automatically generated profile information. According to one embodiment, the method further comprising an act of communicating automatically generated profile information to a respective energy device for confirmation. According to one embodiment, the method further comprising acts of monitoring usage patterns for deviation from automatically generated profile information, and redefining categorization of the energy device consistent with monitored usage patterns. According to one embodiment, the method further comprises determining that a native format or operation information communicated from an end user device lacks sufficient information to complete the standard format. According to one embodiment, responsive to determining the operation information lacks information, triggering a query to capture additional information and complete the standard format for the respective communication. According to one embodiment, responsive to determining the operation information lacks information, triggering a query (e.g., to the end user device and/or location) to capture additional information and complete the standard format for the respective communication. According to one embodiment, the method further comprises executing a query on an end user device to capture additional information. According to one embodiment, the method further comprises executing a query on an end user device location to capture additional information. According to one embodiment, the method further comprises generating inferred values from historic user data to determine the insufficient information According to one embodiment, the method further comprises executing a machine learning model on similar users having similar usage patterns and/or similar future use preference (e.g., wherein the future use preference describes energy usage preference based on a category of energy usage and a user defined energy use modification rule or rules) and generate with the machine learning model values to complete the information to complete the standard format. According to one embodiment, the modification rule or rules is based on specified delivery price expected to occur at a future time and a limitation or increase on energy usage responsive to the specified delivery price to occur at a future time According to one aspect, an energy management and delivery system for use with an energy grid is provided. The system comprises a first electronic interface to a plurality of centralized grid management systems and distribution nodes connected thereto, the centralized grid management systems and distribution nodes comprising the energy grid, the first electronic interface being configured to retrieve operation information associated with components of the energy grid, the operation information including data relating to a location and a value for the associated components, the operation information having a native format that varies based on its source, a second electronic interface connected to a plurality of end user energy consumers, the second electronic interface being configured to receive from the end user energy consumers requests for energy loads and preferences associated with those requests for energy loads, as well as offers to provide energy and preferences associated with those offers, and processing resources, including at least one processor and a memory coupled thereto, the processing resources being configured to programmatically apply predefined rules from a predefined rule set stored in a data store to the retrieved operation information to translate the retrieved operation information from its native format into standardized location data and standardized value data including additional information relative to at least some corresponding retrieved natively formatted operation information, wherein the predefined rules that are applied are selected based on the source and content of the operation information, schedule, based on the received requests, preferences associated with the received requests, the received offers, preferences associated with the received offers, and the standardized location data and standardized value data, selective provisioning of energy from the energy grid to the end user energy consumers and to the energy grid from the end user energy consumers, via one or more of the centralized grid management systems, the scheduling being automated and standardized for the centralized grid management systems in accordance with operational protocols specific to individual ones of the centralized grid management systems, transmitting scheduling information, based on the scheduling, to the centralized grid management systems to prompt the centralized grid management systems to forecast future loads and balance delivery of current-day loads in the grid, trigger delivery of energy in accordance with the scheduled selective provisioning, regardless of the transactional protocol(s) implemented by the one or more of the centralized grid management systems associated with the scheduled provisioning, by communicating with the centralized grid management systems using respective native formats across the first electronic interface and the end user energy consumers across the second electronic interface, and sending a signal to the end user energy consumers to activate devices in accordance with their preferences relating to received requests in accordance with the scheduled selective provisioning.

According to one embodiment, the centralized grid management systems include independent system operators, operation information in a first native format includes location and/or value related data at a nodal level and operation information in a second native format includes location and/or value related data at level more coarse than the nodal level, the second native format including location and/or value related data aggregated for a plurality of nodes, the preferences pertain to individual load-bearing devices, the preferences specifying one or more of: (a) whether a an operational parameter of a corresponding load-bearing device is adjustable, (b) a range in which an operational parameter of a corresponding load-bearing device is adjustable, (c) a time at and/or time range in which a corresponding load-bearing device can be activated and/or deactivated, (d) a time at and/or time range in which an operational parameter of a corresponding load-bearing device is adjustable, and (e) an exchange condition, and the scheduling is performed by executing a scheduling algorithm, the scheduling algorithm being defined for a given one or more of the centralized grid management systems and taking into account operational parameters specific to the given one or more of the centralized grid management systems.

It will be appreciated that certain example embodiments are able to show index values at the nodal level, which currently is not possible under conventional approaches. In this regard, certain example embodiments enable users to act on such indexed values. This is made possible, for example, by standardizing the nomenclature of how to refer to physical points of interface with the grid relevant to the consumer (nodes/substations), providing an API so that devices can use standardized names to get and send price and load equivalent information, etc. An interface provided by the system also allows for the real-time buying and selling of energy. This may be automated and may in some embodiments (1) involve gathering data from IoT-enabled devices, comparing such information and optionally information from the index to pre-provided customer preferences, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one hardware processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An energy device control system executing on a distributed grid subsystem operative to control power demand of a plurality of energy devices, the energy device control system comprising:
    at least one processor operatively connected to a memory;
    a graphical user interface, executed by the at least one processor, configured to accept a user input indicative of a first power demand and an energy priority associated with a plurality of respective energy devices, including plurality of respective energy devices including storage devices;
    a communication interface, executed by the at least one processor, configured to aggregate demand values establishing a projected cost for respective power demand from a plurality of system nodes, the plurality of systems nodes including the plurality of energy devices and at least a plurality of energy generation nodes the aggregate demand values including a power demand and an energy priority for the plurality of energy devices; and
    wherein the at least one processor is further configured to:
        use an updateable learning model for evaluating dynamic future allocation of required energy with future energy generation prediction, wherein the dynamic future allocation includes operations to refine predicted energy demand including a categorization of energy priority of the plurality of respective energy devices and optimization of energy pricing incorporating user preference specified for potential energy cost savings;
        trigger energy generation on the energy grid at respective generator nodes at least according to the forecasted energy demand and the updateable learning model;
        wherein use of the updateable learning model further comprises operations to:
            identify uncategorized energy devices; and
            automatically assign a category of energy priority to an energy device without a category of energy priority.

2. The system of claim 1, wherein the at least one processor is configured to identify incomplete information sets for respective energy devices and locality based pricing, and automatically query the respective energy devices or automatically infer at least some incomplete information for the respective energy devices and locality based pricing.

3. The system of claim 1, wherein the energy priority specifies control of a timing for operation of a respective device.

4. The system of claim 3, wherein specification of the control of the timing includes a priority assignment for must run, must run with limited flexibility, must run within a specified time window, must run within a longer time deferment window relative to the must run within a specified time window category up to one day, and a fourth category of complete discretion.

5. The system of claim 1, wherein the storage devices include batteries or electric vehicles.

6. The system of claim 1, wherein the at least one processor is further configured to update the learning model based on the assigned energy priority category.

7. The system of claim 1, wherein the at least one processor is further configured to translate operation and pricing data into a standard format with locally information.

8. The system of claim 1, wherein the system is configured to include analysis of at least one or more of: end users' service entirely from a wholesale electric grid or end users having distributed energy generation capability.

9. The system of claim 1, wherein the system is configured to update energy requirement responsive to analyzing consumption type, including, at least an end user with solar generation and storage capability, wherein the system is configured to optimize delivery of generation capability to include direct injection of solar generation to the energy grid.

10. The system of claim 1, wherein the system is configured to model energy requirement responsive to analyzing a consumption type, including, at least one of at least an end user with gross consumption, an end user with gross generation, an end user with a storage capability, an end user with energy generation capability, or an end user with energy generation capability and with energy storage capability, and optimize for the respective consumption type.

11. A computer implemented method for energy device control executing on a distributed grid subsystem, the method operative to control demand of a plurality of energy devices, the method comprising:
    accepting in a graphical user interface a user input indicative of a first demand and energy priority associated with a respective energy device;
    aggregating, by at least one processor, demand values establishing a projected cost for respective power demand from a plurality of system nodes, the plurality of systems nodes including the plurality of energy devices and at least a plurality of generator nodes configured to supply electricity, the aggregate demand values including at least the user input indicative of a first demand and the dynamic allocation flexibility for the first power demand, and respective values for power demand and energy priority for a plurality of energy devices, the plurality of respective energy devices including storage devices;
    updating, by the at least one processor, an updateable learning model for evaluating dynamic future allocation of required energy with future energy generation prediction, wherein the dynamic future allocation includes predicted energy demand based on an energy priority categorization of the plurality of respective energy devices and optimization of energy pricing; and
    triggering, by the at least one processor, energy generation on the energy grid at respective generator nodes at least according to the forecasted energy demand and energy pricing of the updateable learning model and dynamic projections;
    wherein the act of updating of the updateable learning model further comprises:
        identifying uncategorized energy devices;
        automatically assigning an energy priority category to an energy device without the energy priority category.

12. The method of claim 11, wherein the method further comprises identifying, by the at least one processor, incomplete information sets for respective energy devices and locality based pricing, and automatically querying the respective energy devices or automatically inferring at least some incomplete information for the respective energy devices and locality based pricing.

13. The method of claim 11, wherein the energy priority specifies control of a timing for operation of a respective device.

14. The method of claim 13, wherein specification of the control of the timing includes a priority assignment for must run, must run with limited flexibility, must run within a specified time window, must run within a longer time deferment window relative to the must run within a specified time window category up to one day, and a fourth category of complete discretion.

15. The method of claim 11, wherein the storage devices include batteries or electric vehicles.

16. The method of claim 11, wherein the method further comprises updating, by the at least one processor, the learning model based on the assigned energy priority category.

17. The method of claim 11, wherein the method further comprises translating operation and pricing data into a standard format with locally information.

18. The method of claim 11, wherein the method further comprises analyzing, by the at least one processor, at least one or more of: end users' service entirely from a wholesale electric grid or end users having distributed energy generation capability.

19. The method of claim 11, wherein the method further comprises updating, by the at least one processor, energy requirement responsive to analyzing consumption type, including, at least an end user with net consumption and with energy generation capability, or an end user with a net consumption coupled with energy generation and coupled with energy storage capability.

20. The method of claim 11, wherein the method further comprises modeling, by the at least one processor, energy requirement responsive to analyzing a consumption type, including, at least one of at least an end user gross consumption, an end user with a storage capability, an end user with net consumption and with energy generation capability, or an end user with net consumption and with energy generation capability and with energy storage capability.

* * * * *